(12) United States Patent
Kanenari et al.

(10) Patent No.: US 6,588,470 B2
(45) Date of Patent: Jul. 8, 2003

(54) PNEUMATIC RADIAL TIRE REINFORCED WITH FIBRILLATED SEA-ISLAND SHORT POLYMER FIBERS

(75) Inventors: Daisuke Kanenari, Hiratsuka (JP); Riichiro Mama, Hiratsuka (JP); Kazuto Yamakawa, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 140 days.

(21) Appl. No.: 09/774,670

(22) Filed: Feb. 1, 2001

(65) Prior Publication Data

US 2001/0010245 A1 Aug. 2, 2001

Related U.S. Application Data

(62) Division of application No. 09/159,687, filed on Sep. 24, 1998, now Pat. No. 6,209,603.

(30) Foreign Application Priority Data

Sep. 30, 1997 (JP) .............................................. 9-265831

(51) Int. Cl.[7] .............................. B60C 1/00; B60C 11/00
(52) U.S. Cl. ..................................... 152/209.4; 152/458
(58) Field of Search .............................. 152/458, 209.4

(56) References Cited

U.S. PATENT DOCUMENTS 4,350,006 A * 9/1982 Okamoto et al. ........ 428/373 X
4,871,004 A * 10/1989 Brown et al. ............. 152/209.4
5,472,995 A * 12/1995 Kaminski et al. ........... 523/155

* cited by examiner

Primary Examiner—Adrienne C. Johnstone
(74) Attorney, Agent, or Firm—Rader, Fishman & Grauer PLLC

(57) ABSTRACT

A pneumatic tire comprising a rubber member containing a short fiber (A') formed by the fibrillation of a short fiber (A) whose cross section takes a sea-island structure essentially composed of at least two polymers.

2 Claims, 8 Drawing Sheets

PNEUMATIC RADIAL TIRE REINFORCED WITH FIBRILLATED SEA-ISLAND SHORT POLYMER FIBERS

This is a Division of application Ser. No. 09/159,687 filed Sep. 24, 1998 now U.S. Pat. No. 6,209,603. The disclosure of the prior application is hereby incorporated by reference herein in its entirety.

BACKGROUND OF THE INVENTION

The present invention relates to a pneumatic tire improved in various tire performance parameters, which is effectively reinforced by incorporating a specific short fiber into a rubber member constituting the tire so as to satisfy the basic requirements for a tire.

As a means for reinforcing the rubber member constituting a tire, it has been a common practice to embed reinforcement cords in the rubber or to use a high-hardness rubber. When the rigidity of the rubber member was uniformly changed to improve a specific tire performance, however, a problem occurred that the other tire performance parameters were lowered.

With respect to a pneumatic radial tire, for example, it has been known that road noise can be reduced by enhancing the rigidity of the shoulder portions near the belt edges. It has therefore been a general practice to insert sheets or fillers made of a high hardness compound under both belt end portions to thereby enhance the rigidity of the shoulder portions. When such sheets or fillers made of a high-hardness compound are used, however, the basic performance parameters such as comfortableness in riding and stability in steering are changed by enhancement in the rigidity of the shoulder portions, even though road noise can be reduced.

Further, attempts have been made to enhance selectively the modulus of a rubber member constituting a tire in a specific direction by incorporating a short fiber made of nylon or the like into the rubber member and orienting it in the specific direction. However, the short fibers of the prior art have failed in attaining such effective reinforcement as to satisfy the basic requirements for a tire.

SUMMARY OF THE INVENTION

The first object of the present invention is to provide a pneumatic tire that is so effectively reinforced by incorporating a specific short fiber into a rubber member constituting the tire as to satisfy the basic requirements for a tire.

The second object of the present invention is to provide a pneumatic tire which is reduced in road noise by the use of the above specific short fiber with the basic performance parameters such as comfortableness in riding and stability in steering being kept at high levels.

The third object of the present invention is to provide a pneumatic tire which can exhibit excellent braking performance both on a dry road surface and on a wet road surface by virtue of the use of the above specific short fiber.

The fourth object of the present invention is to provide a pneumatic tire comprising an under tread made of a rubber exhibiting a small energy loss (for lowering rolling resistance), which tire has a reduced nonuniformity of gauge resulting from rubber flow occurring during the molding of the tire with vulcanization and improved stability in steering, by virtue of the use of the above specific short fiber.

The fifth object of the present invention is to provide a pneumatic tire that is reduced in the sidewall gauge by the use of the above specific short fiber with a reduction in the weight without impairing the resistance of the sidewall to external damage.

The sixth object of the present invention is to provide a pneumatic tire that is improved in durability by the use of the above specific short fiber with a decrease in the rubber volume of the bead portions.

The seventh object of the present invention is to provide a pneumatic tire which is reduced in the weight and improved in comfortableness in riding by the use of the above specific short fiber with the stability in steering being kept at a level equivalent or superior to that of a tire provided with steel reinforcements in the neighborhood of the bead fillers.

The pneumatic tire of the present invention achieving the above first object is one comprising a rubber member containing a short fiber (A') formed by the fibrillation of a short fiber (A) whose cross section takes a sea-island structure essentially composed of at least two polymers.

When the above fibrillated short fiber (A') is incorporated into the rubber member, the short fiber (A') enhances the modulus of the member at low elongation by leaps and bounds to exhibit excellent reinforcing effect.

The term "modulus" used in this specification refers to "modulus at 20% elongation" (hereinafter referred to merely as "20% modulus"). A tire is generally used in the strain range of 50% or below, so that the characteristics of a rubber at low elongation based on 20% modulus highly correlate with tire performance parameters. Thus, a tire can be reinforced effectively by enhancing the 20% modulus. Accordingly, the reinforcement of a tire with the above short fiber makes it possible to improve various tire performance parameters required depending on the use of the tire.

Such 20% modulus can be determined according to the method of tensile test at low elongations as stipulated in JIS K6301. This method comprises using a test piece having a width of 5 mm, a length of 100 mm, a thickness of 2 mm and a distance of 40 mm between two gage marks, stretching this test piece preliminarily twice at a rate of 45±15 mm/min by 1.5 times the elongation (20%) to be subjected in the test, stretching the resulting test piece by 20% at the same rate as that employed in the preliminary stretching and keeping the same in the state thus stretched, and measuring the load after the lapse of 30 seconds. The modulus at 20% elongation (20% modulus) can be determined by the following formula. The measurement of the load is repeated generally four times and the average of the four values is used.

$$\sigma_{20} = F_{20}/S$$

$\sigma_{20}$: modulus at 20% elongation (MPa)
$F_{20}$: load at 20% elongation (N)
S: sectional area of test piece A pneumatic tire of the present invention achieving the above second object is a pneumatic radial tire which comprises a carcass layer bridging a pair of, i.e., lefthand and righthand bead portions and a plurality of belt layers lying in the tread portion on the outside of the carcass layer and which further comprises compound sheets lying in both tire widthwise end portions of the belt layers respectively, with the ratio of the tire circumferential modulus (b) of the compound sheets to the tire radial modulus (a) thereof (i.e., b/a ratio) being adjusted to 1.2 or above by incorporating a short fiber (A') formed by the fibrillation of a short fiber (A) whose cross section takes a sea-island structure essentially composed of at least two polymers into the rubber constituting the compound sheets in a proportion of 0.5 to 15 parts by weight per 100 parts by weight of the rubber and orienting the fibrillated short fiber (A') in a tire circumferential direction.

Another pneumatic tire of the present invention achieving the above second object is a pneumatic radial tire which comprises a carcass layer bridging a pair of, i.e., lefthand and righthand bead portions and a plurality of belt layers lying in the tread portion on the outside of the carcass layer and which further comprises compound sheets lying in both tire widthwise end portions of the belt layers respectively, with the ratio of the tire circumferential modulus (b) of the compound sheets to the tire radial modulus (a) thereof (i.e., b/a ratio) being adjusted to 1.2 or above by incorporating a short fiber (A') formed by the fibrillation of a short fiber (A) whose cross section takes a sea-island structure essentially composed of at least two polymers and a composition comprising a short fiber (B) made of a thermoplastic polymer having amido groups in the main chain and a matrix made of a rubber and/or a polyolefin wherein the short fiber (B) is dispersed in the matrix and chemically bonded to the matrix into the rubber constituting the compound sheets in proportions of 0.5 to 10 parts by weight of the fibrillated short fiber (A') and 1 to 15 parts by weight of the short fiber (B) per 100 parts by weight of the rubber and orienting the fibrillated short fiber (A') and the short fiber (B) in a tire circumferential direction.

In the above cases wherein such anisotropic rubber compound sheets that the tire circumferential modulus (b) is larger than the tire radial modulus (a) by a specific factor or above are laid in both end portions of the belt layers, the rigidities in the tire width direction and in the tire radial direction (perpendicular to the tire rotating shaft) can be adjusted to levels equivalent to those of the prior art with an enhancement in the tire circumferential rigidity of the shoulder portions near the belt edges. This makes it possible to reduce road noise with the basic performance parameters such as comfortableness in riding and stability in steering being kept at high levels.

A pneumatic tire of the present invention achieving the above third object is one wherein the ratio of the tire circumferential modulus (b) of the tread to the tire radial modulus (a) thereof (i.e., b/a ratio) is adjusted to 1.2 or above by incorporating a short fiber (A') formed by the fibrillation of a short fiber (A) whose cross section takes a sea-island structure essentially composed of at least two polymers into the tread rubber in a proportion of 0.5 to 15 parts by weight per 100 parts by weight of the rubber and orienting the short fiber (A') in a tire circumferential direction, and the groove area ratio of the tread is adjusted to 30 to 40%

Another pneumatic tire of the present invention achieving the above third object is one wherein the ratio of the tire circumferential modulus (b) of the tread to the tire radial modulus (a) thereof (i.e., b/a ratio) is adjusted to 1.2 or above by incorporating a short fiber (A') formed by the fibrillation of a short fiber (A) whose cross section takes a sea-island structure essentially composed of at least two polymers and a composition comprising a short fiber (B) made of a thermoplastic polymer having amido groups in the main chain and a matrix made of a rubber and/or a polyolefin wherein the short fiber (B) is dispersed in the matrix and chemically bonded to the matrix into the tread rubber in proportions of 0.5 to 10 parts by weight of the fibrillated short fiber (A') and 1 to 15 parts by weight of the short fiber (B) per 100 parts by weight of the rubber and orienting the fibrillated short fiber (A') and the short fiber (B) in a tire circumferential direction and the groove area ratio of the tread is adjusted to 30 to 40%.

Although a pneumatic tire having a larger ground-contacting area is more advantageous in braking performance on a dry road surface, it is also required to have sufficient groove area enough to secure satisfactory drainage performance on a wet road surface. Therefore, there is a limit to the improvement of both braking performance on a dry road surface and that on a wet road surface in a well-balanced state by changing the groove area ratio.

In the above cases wherein the groove area ratio of the tread is limited to the above range and such an anisotropic rubber tread that the tire circumferential modulus (b) is larger than the tire radial modulus (a) by a specific factor or above is employed, only the tire circumferential rigidity of the tread can selectively be enhanced. At the same time, sufficient actual ground-contacting area is secured by controlling the tire radial rigidity of the tread to a conventional level or below. Thus, the braking performance on a dry road surface can well meet with that on a wet road surface at high levels.

A pneumatic tire of the present invention achieving the above fourth object is one wherein the tread portion is constituted of at least two layers comprising a cap tread and an under tread, and the ratio of the tire circumferential modulus (b) of the under tread to the tire widthwise modulus (a) thereof (i.e., b/a ratio) is adjusted to 1.5 or above by incorporating a short fiber (A') formed by the fibrillation of a short fiber (A) whose cross section takes a sea-island structure essentially composed of at least two polymers into the rubber constituting the under tread in a proportion of 1 to 15 parts by weight per 100 parts by weight of the rubber and orienting the fibrillated short fiber (A') in a tire circumferential direction.

Another pneumatic tire of the present invention achieving the above fourth object is one wherein the tread is constituted of at least two layers comprising a cap tread and an under tread, and the ratio of the tire circumferential modulus (b) of the under tread to the tire widthwise modulus (a) thereof (i.e., b/a ratio) is adjusted to 1.5 or above by incorporating a short fiber (A') formed by the.fibrillation of a short fiber (A) whose cross section takes a sea-island structure essentially composed of at least two polymers and a composition comprising a short fiber (B) made of a thermoplastic polymer having amido groups in the main chain and a matrix made of a rubber and/or a polyolefin wherein the short fiber (B) is dispersed in the matrix and chemically bonded to the matrix into the rubber constituting the under tread in proportions of 1 to 12 parts by weight of the fibrillated short fiber (A') and 1 to 10 parts by weight of the short fiber (B) per 100 parts by weight of the rubber and orienting the fibrillated short fiber (A') and the short fiber (B) in a tire circumferential direction.

For the purpose of meeting the recent demand for improved fuel consumption of vehicles, various attempts were made to reduce the rolling resistance of a tire. As a technique of reconciling improved fuel consumption with traveling performance on a wet road surface, for example, it has been a common practice to employ a two-layer tread constituted of a cap tread and an under tread to thereby decrease the volume of the cap tread exhibiting a large energy loss. In this practice, specifically, a rubber excellent in wet performances is used as the cap tread and a rubber exhibiting a small energy loss is used as the under tread.

When the content of carbon black in the under tread is lowered in order to lower the energy loss of the under tread, however, the resulting rubber gives too soft of a vulcanizate to attain satisfactory stability in steering. On the other hand, when a butadiene rubber excellent in impact resilience is incorporated into the under tread, the resulting under tread has such a low green viscosity as to cause rubber flow easily in pressing against the tread the groove-forming skeletons present on the inner surface of a mold during the molding of the tire with vulcanization. Therefore, the under tread becomes too thin in the portions located under grooves and becomes too thick in the portions located under blocks. Thus, the tire provided with an under tread containing a butadiene rubber or the like is disadvantageous in that the under tread comes out to the surface in the last stage of wear to result in poor traction performance.

In the above cases wherein the ratio of the tire circumferential modulus (b) of the under tread to the tire widthwise modulus (a) thereof (i.e., b/a ratio) is adjusted to 1.5 or above by incorporating a short fiber (A') formed by the fibrillation of a short fiber (A) whose cross section takes a sea-island structure essentially composed of at least two polymers in a specific proportion and orienting the short fiber (A') in a tire circumferential direction, the molding of the tire with vulcanization exhibits little rubber flow thereby obtained an improved uniformity in the under tread gauge, even if a rubber exhibiting a low energy loss is used as the under tread for the purpose of reducing the rolling resistance of the tire. After the vulcanization, the fibrillated short fiber (A') is present in the under tread in a state oriented in a tire circumferential direction to exhibit a high reinforcing effect, thus improving the stability in steering.

The above fibrillated short fiber (A') has excellent features as compared with the nylon short fiber and carbon black according to the prior art. Specifically, a rubber containing the fibrillated short fiber (A') even in a large amount suffers little from the rise of tan δ, even though a rubber containing carbon black in an amount increased for the purpose of enhancing the hardness of the under tread exhibits an enhanced tan δ with a rise in the hardness. Further, a rubber containing the fibrillated short fiber (A') even in a large amount has a slightly increased green viscosity, even though a rubber containing a large amount of the nylon short fiber of the prior art exhibits too high a green viscosity to exhibit satisfactory processability in kneading and extrusion. Therefore, the incorporation of the fibrillated short fiber (A') into a rubber can enhance the green modulus of the rubber not only in the grain direction (direction of orientation of the fiber) but also in the reverse grain direction (perpendicular to the direction of orientation of the fiber). Thus, the incorporation of the fibrillated short fiber (A') into an under tread gives an under tread which is hard and exhibits a low heat build-up. Further, this under tread is therefore inhibited from rubber flow during the vulcanization of the tire by virtue of its high green strength, in spite of its being more excellent in processability than the one containing the nylon short fiber of the prior art. Furthermore, the incorporation of the fibrillated short fiber (A') also brings about the effect of inhibiting the rubber compound from cold flow during the storage.

A pneumatic tire of the present invention achieving the above fifth object is one wherein at least a part of the sidewall is made of a rubber composition containing 0.5 to 15 parts by weight of a short fiber (A') formed by the fibrillation of a short fiber (A) whose cross section takes a sea-island structure essentially composed of at least two polymer.

Another pneumatic tire of the present invention achieving the above fifth object is one wherein at least a part of the sidewall is made of a rubber composition containing a short fiber (A') formed by the fibrillation of a short fiber (A) whose cross section takes a sea-island structure essentially composed of at least two polymers and a composition comprising a short fiber (B) made of a thermoplastic polymer having amido groups in the main chain and a matrix made of a rubber and/or a polyolefin wherein the short fiber (B) is dispersed in the matrix and chemically bonded to the matrix in proportions of 0.5 to 10 parts by weight of the fibrillated short fiber (A') and 1 to 15 parts by weight of the short fiber (B) per 100 parts by weight of the rubber.

The resistance of a pneumatic tire to external damage is lowered, when the gauge of the sidewall rubber is merely decreased for the purpose of reducing the weight. Although a sidewall can be reinforced by adding nylon short fiber to the rubber constituting the sidewall, the reinforcement with nylon fiber results in an unsatisfactory reinforcing effect. Thus, no satisfactory resistance to external damage can be secured, when the weight of a tire is reduced by decreasing the sidewall gauge.

In the above cases wherein a short fiber (A') formed by the fibrillation of a short fiber (A) whose cross section takes a structure essentially composed of at least two polymers is incorporated into the sidewall rubber in a specific proportion, the fibrillated short fiber (A') enhances the modulus at low elongation by leaps and bounds to exhibit an excellent reinforcing effect, which makes it possible to secure satisfactory resistance to external damage even when the weight of a tire is reduced by decreasing the sidewall gauge.

It is preferable that the fibrillated short fiber (A') be oriented in a direction parallel to the sidewall face. The fibrillated short fiber (A') may be oriented in any state in the tire circumferential and radial directions, as far as it is oriented in a direction parallel to the sidewall face. For example, the short fiber (A') may be oriented in a specific direction (such as circumferential direction) or arranged at random. The maximum reinforcing effect of the fibrillated short fiber (A') can be exhibited, when the fiber (A') is oriented in such a state.

A pneumatic tire of the present invention achieving the above sixth object is a heavy-duty pneumatic radial tire comprising a carcass layer which contains a plurality of carcass cords in a state arranged in the tire radial direction and bridges a pair of, i.e., lefthand and righthand bead portions with both tire widthwise end portions of the carcass layer wound up around the bead cores respectively from the tire inner side to the tire outer side, and which further comprises short fiber reinforced layers lying at least in the wound-up end portions of the carcass layer, with the ratio of the tire circumferential modulus (b) of the short fiber reinforced layers to the tire radial modulus (a) thereof (i.e., b/a ratio) being adjusted to 1.2 or above by incorporating a short fiber (A') formed by the fibrillation of a short fiber (A) whose cross section takes a sea-island structure essentially composed of at least two polymers into the rubber constituting the short fiber reinforced layers in a proportion of 0.5 to 15 parts by weight per 100 parts by weight of the rubber and orienting the short fiber (A') in a tire circumferential direction.

Another pneumatic tire of the present invention achieving the above sixth object is a heavy-duty pneumatic radial tire comprising a carcass layer which contains a plurality of carcass cords in a state arranged in the tire radial direction, bridges a pair of, i.e., lefthand and righthand bead portions with both tire widthwise end portions of the carcass layer wound up around the bead cores respectively from the tire inner side to the tire outer side, and further comprises short fiber reinforced layers lying at least in the wound-up end portions of the carcass layer, with the ratio of the tire circumferential modulus (b) of the short fiber reinforced layers to the tire radial modulus (a) thereof (i.e., b/a ratio) being adjusted to 1.2 or above by incorporating a short fiber (A') formed by the fibrillation of a short fiber (A) whose cross section takes a sea-island structure essentially composed of at least two polymers and a composition comprising a short fiber (B) made of a thermoplastic polymer having amido groups in the main chain and a matrix made of a rubber and/or a polyolefin wherein the short fiber (B) is dispersed in the matrix and chemically bonded to the matrix into the rubber constituting the short fiber reinforced layers in proportions of 0.5 to 10 parts by weight of the fibrillated short fiber (A') and 1 to 15 parts by weight of the short fiber (B) per 100 parts by weight of the rubber and orienting the fibrillated short fiber (A') and the short fiber (B) in a tire circumferential direction.

There have been known heavy-duty pneumatic radial tires wherein reinforcing layers containing steel cords or organic fiber cords are laid in the bead portions for the purpose of enhancing durability. Even when such a reinforcing structure is formed, however, it is still difficult to inhibit the delamination among cords occurring in the wound-up end portions of the carcass layer.

Precisely, the wound-up end portions of the carcass layer contain parts wherein the carcass cords are not bonded to the rubber, so that cracks are initiated in such parts and then grown to result in the delamination among carcass cords. Although it has been known that the wound-up end portions of the carcass layer can be reinforced with rubber reinforcement layers, such reinforcement not only fails in attaining a satisfactory effect, but also brings about an increase in the weight.

In the above cases wherein such anisotropic short fiber reinforced rubber layers that the tire circumferential modulus (b) is larger that the tire radial modulus (b) by a specific factor or above are laid in the wound-up end portions of the carcass layer, the cords arranged in the tire radial direction are effectively inhibited from moving in a tire circumferential direction, so that the stress concentration in the wound-up end portions can be relaxed with a decrease in the rubber volume of the bead portions to thereby inhibit the delamination among cords and thus enhance the durability of the tire. Additionally, when a steel cord reinforced layer containing a plurality of steel cords in a state arranged in the tire radial direction is further laid in such a way as to lie along the carcass layer in the bead portions, the delamination among cords in the upper end portions of the steel cord reinforced layer can also be inhibited by laying the short fiber reinforced layers in the upper end portions of the steel cord reinforced layer.

A pneumatic tire of the present invention achieving the above seventh object is a pneumatic radial tire comprising bead fillers located on the outer peripheral sides of the bead cores respectively, wherein the bead fillers are made of a rubber composition containing a short fiber (A') formed by the fibrillation of a short fiber (A) whose cross section takes a sea-island structure essentially composed of at least two polymers in a proportion of 3 to 15 parts by weight per 100 parts by weight of the rubber in a state oriented in a direction perpendicular to the tire radial direction, whereby the ratio of the storage modulus (b) of the bead fillers in the direction of orientation of the short fiber to the tire radial storage modulus (a) thereof (i.e., b/a ratio) is adjusted to 4 to 10.

Another pneumatic tire of the present invention achieving the above seventh object is a pneumatic radial tire comprising bead fillers located on the outer peripheral sides of the bead cores respectively, wherein the bead fillers are made of a rubber composition containing a short fiber (A') formed by the fibrillation of a short fiber (A) whose cross section takes a sea-island structure essentially composed of at least two polymers and a composition comprising a short fiber (B) made of a thermoplastic polymer having amido groups in the main chain and a matrix made of a rubber and/or a polyolefin wherein the short fiber (B) is dispersed in the matrix and chemically bonded to the matrix in proportions of 3 to 10 parts by weight of the fibrillated short fiber (A') and 1 to 15 parts by weight of the short fiber (B) per 100 parts by weight in a state oriented in a direction perpendicular to the tire radial direction, whereby the ratio of the storage modulus (b) of the bead fillers in the direction of orientation of the short fiber to the tire radial storage modulus (a) thereof (i.e., b/a ratio) is adjusted to 4 to 10.

In improving the stability in steering of a pneumatic radial tire having an aspect ratio of 60% or below, means for laying steel reinforcements in the neighborhood of the bead fillers is generally employed. This is because the rigidity of the bead portions cannot sufficiently be enhanced merely by enhancing the rigidity of the bead fillers. When such steel reinforcements are laid in the bead portions, however, the resulting tire is significantly deteriorated in comfortableness in riding owing to its too high tire radial rigidity and is increased in weight. On the other hand, when no steel reinforcement is used, the resulting tire is poor in stability in steering, because of the bead portions being too soft.

In the above cases wherein anisotropic rubber bead fillers which contain the fibrillated short fiber (A') in a state oriented in a direction perpendicular to the tire radial direction and in which the storage modulus (b) in the direction of orientation of the short fiber is larger than the tire radial storage modulus (a) by a specific factor or above are laid on the outer peripheral sides of the bead cores, the rigidity of the bead portions in a direction perpendicular to the tire radial direction can be enhanced without any substantial change in the rigidity of the bead portions in the tire radial direction. Accordingly, the use of such bead fillers makes it possible to secure not only stability in steering equivalent or superior to that of a tire provided with steel reinforcements in the neighborhood of the bead fillers but also comfortableness in riding and a light weight equivalent to those of a tire not provided with any steel reinforcement.

The above anisotropy of the bead fillers can be attained by orienting the fibrillated short fiber (A') in a direction perpendicular to the tire radial direction. The short fiber (A') may be oriented in a tire circumferential direction or the tire rotating shaft direction. The orientation in a tire circumferential direction is preferable. Alternatively, two-layer bead fillers constituted of two layers laminated in the tire rotating shaft direction may be employed, one of the layers containing the short fiber in a state oriented in the tire circumferential direction and the other layer containing it in a state oriented in the tire rotating shaft direction.

It is preferable that the above anisotropic constitution of bead fillers be applied to pneumatic radial tires having aspect ratios of 60% or below. The application to such oblate tires brings about more remarkable functions and effects.

In this specification, each storage modulus value is one determined with respect to a test piece having a width of 5 mm, a length of 20 mm and a thickness of 2 mm by using a viscoelasticity spectrometer at a strain of 5±1%, a frequency of 20 Hz and a temperature of 20° C.

DETAILED DESCRIPTION OF THE PREFERRED EMBODIMENTS

Figure 1:
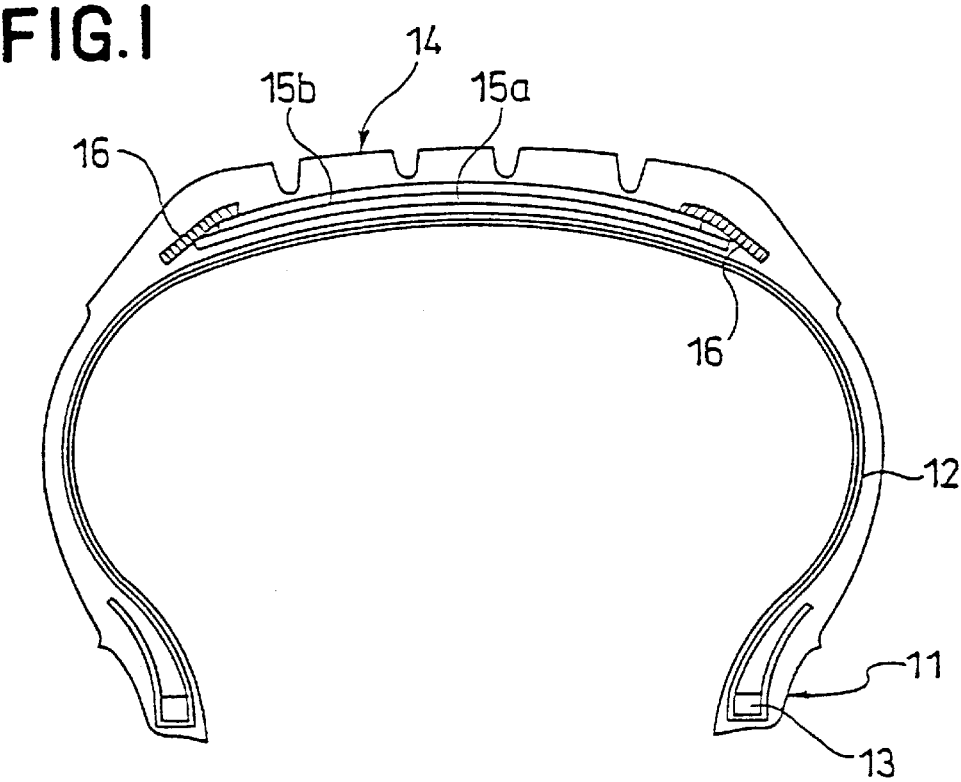
FIG. 1 is a meridional sectional view showing an example of the pneumatic radial tire according to the first embodiment of the present invention.

FIG. 1 shows an example of the pneumatic radial tire according to the first embodiment of the present invention. In FIG. 1, a carcass layer 12 containing a plurality of reinforcement cords in a state arranged in the radial direction bridges a pair of, i.e., lefthand and righthand bead portions 11, 11. Both tire widthwise end portions of the carcass layer 12 are wound up around the bead cores 13 respectively from the tire inner side to the tire outer side.

Two belt layers 15a and 15b each containing a plurality of steel cords are laid in the tread portion 14 on the outside of the carcass layer 12. These belt layers 15a and 15b are laid in such a way that the reinforcement cords are arranged obliquely to the tire circumferential direction and that the reinforcement cords contained in one of the layers 15a and 15b cross those contained in the other layer. In the inner belt layer 15a, the angle of cord is adjusted to 15 to 30° to the tire circumferential direction, while in the outer belt layer 15b, the angle of cord is adjusted to 15 to 30° thereto.

Figure 2:
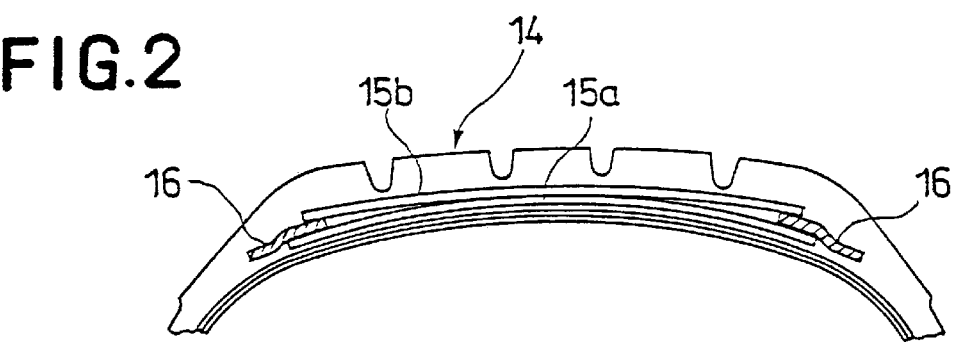
FIG. 2 is a meridional sectional view showing the essential portion of a modification example of the pneumatic radial tire according to the first embodiment of the present invention.
Figure 3:
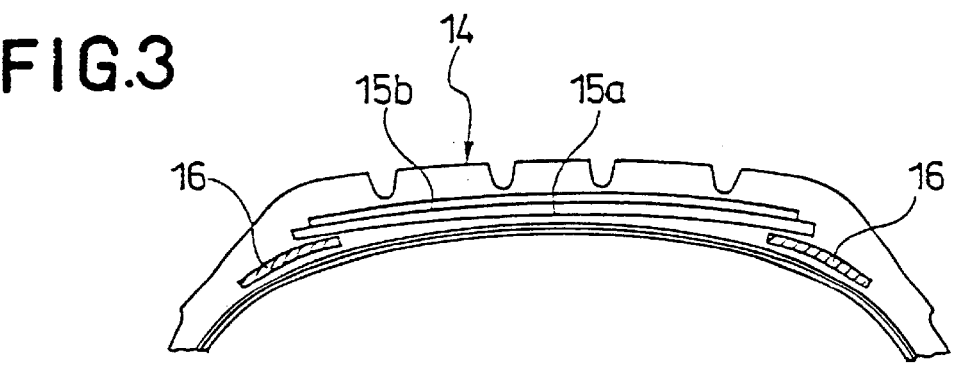
FIG. 3 is a meridional sectional view showing the essential portion of another modification example of the pneumatic radial tire according to the first embodiment of the present invention.

Compound sheets 16 are laid in the tire widthwise end portions of the belt layers 15a and 15b respectively. It is preferable that these compound sheets 16 be laid between the belt layers 15a and 15b as shown in FIG. 2 or on the outside of the belt layers 15a and 15b as shown in FIG. 1, even though they may be laid on the inside of the belt layer 15a as shown in FIG. 3. Further, belt edge cover layers each containing a plurality of organic fiber cords in a state arranged in a tire circumferential direction may be laid in the tire widthwise end portions of the belt layers 15a and 15b in addition to the above compound sheets 16.

The ratio of the tire circumferential modulus (b) of the compound sheets 16 to the tire radial modulus (a) thereof (i.e., b/a ratio) is adjusted to 1.2 or above by incorporating a short fiber (A') formed by the fibrillation of a short fiber (A) whose cross section takes a sea-island structure essentially composed of at least two polymers and, if necessary, a short fiber (B) made of a thermoplastic polymer having amido groups in the main chain into the rubber constituting the compound sheets 16 and orienting the fibrillated short fiber (A') or the hybridized short fibers (A') and (B) in a tire circumferential direction.

The tire circumferential rigidity can be enhanced selectively by laying such anisotropic compound sheets 16 in both end portions of the belt layers 15a and 15b. Further, road noise can be reduced with the basic performance parameters such as comfortableness in riding and stability in steering being kept at high levels. It is necessary that the ratio of the tire circumferential modulus (b) of the compound sheets 16 to the tire radial modulus (a) thereof (i.e., b/a ratio) is adjusted to 1.2 or above, preferably 1.5 or above. When the ratio is less than 1.2, it will be difficult to reconcile maintaining the basic tire performance with the reduction in road noise. Further, the b/a ratio depends also on hardness of the rubber, loadings of the short fiber, extrusion process of the sheets and so on. The upper limit thereof is about 10.

It is preferable that the compound sheets have a width of at least 5% of the maximum belt width. When the width of the compound sheets 16 is less than 5% of the maximum belt width, the reinforcing effect will be too poor to reduce road noise. When the width of the compound sheets is too large, the comfortableness in riding will be poor, even though a high reinforcing effect is attained. Accordingly, it is preferable that the upper limit of the width of the compound sheets be 40% of the maximum belt width.

Next, it is preferable that the compound sheets 16 have a thickness of 0.3 mm or above. When the thickness of the compound sheets 16 is less than 0.3 mm, the reinforcing effect will be too poor to reduce road noise. On the contrary, when the thickness is too large, the resulting tire will be increased in weight and heat build-up to result in poor durability, even though a high reinforcing effect is attained. Accordingly, it is preferable that the upper limit of the thickness be 3 mm.

When the fibrillated short fiber (A') is used alone for the compound sheets 16, the short fiber (A') is incorporated into the rubber constituting the compound sheets 16 in an amount of 0.5 to 15 parts by weight per 100 parts by weight of the rubber. When the amount of the fibrillated short fiber (A') is less than 0.5 part by weight, it will be difficult to adjust the ratio of the tire circumferential modulus (b) of the compound sheets 16 to the tire radial modulus (a) thereof (i.e., b/a ratio) to 1.2 or above. When the amount exceeds 15 parts by weight, the resulting rubber composition will be very poor in processability in kneading and extrusion. It is to be noted that the amount of the short fiber (A) added is substantially equal to the amount of the fibrillated short fiber (A') incorporated.

For hybridizing the fibrillated short fiber (A') with the short fiber (B) the amount of the fibrillated short fiber (A') incorporated is adjusted to 0.5 to 10 parts by weight per 100 parts by weight of the rubber, while that of the short fiber (B) incorporated is adjusted to 1 to 15 parts by weight. When the total amount of the short fibers (A') and (B) incorporated is less than 1.5 parts by weight, it will be difficult to adjust the ratio of the tire circumferential modulus (b) of the compound sheets 16 to the tire radial modulus (a) thereof (i.e., b/a ratio) to 1.2 or above. When the total amount exceeds 25 parts by weight, the resulting rubber composition will be very poor in processability in kneading and extrusion.

Figure 4:
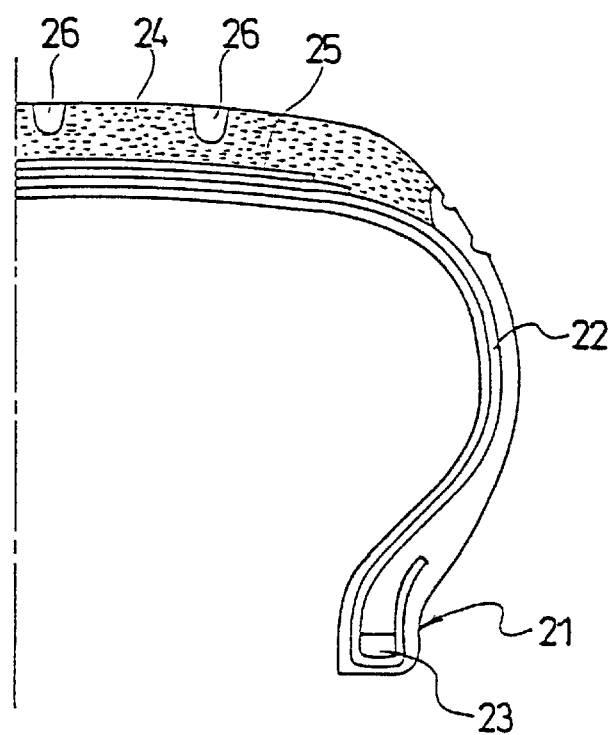
FIG. 4 is a meridional half sectional view showing an example of the pneumatic radial tire according to the second embodiment of the present invention.

FIG. 4 shows an example of the pneumatic radial tire according to the second embodiment of the present invention. In FIG. 4, a carcass layer 22 containing a plurality of reinforcement cords in a state arranged in the radial direction bridges a pair of, i.e., lefthand and righthand bead portions 21, 21, and the tire widthwise end portions of the carcass layer 22 are wound up around the bead cores 23 respectively from the tire inner side to the tire outer side. Further, a plurality of belt layers 25 each containing a plurality of steel cords in a state arranged obliquely to the tire circumferential direction are laid between the tread 24 and the carcass layer 22 in such a way that the reinforcement cords contained in one of the belt layers 25 cross those contained in other layer. The tread 24 has grooves including main grooves 26 extended in the tire circumferential direction, and the groove area ratio of the tread 24 is adjusted to 30 to 40%.

The ratio of the tire circumferential modulus (b) of the tread 24 to the tire radial modulus (a) thereof (i.e., b/a ratio) is adjusted to 1.2 or above by incorporating a short fiber (A') formed by the fibrillation of a short fiber (A) whose cross section takes a sea-island structure essentially composed of at least two polymers and, if necessary, a short fiber (B) made of a thermoplastic polymer having amido groups in the main chain into the rubber constituting the tread 24 and orienting the fibrillated short fiber (A') or the hybridized short fibers (A') and (B) in a tire circumferential direction.

In this embodiment, as described above, the groove area ratio of the tread 24 is adjusted to 30 to 40% and the tire circumferential rigidity of the tread is enhanced by imparting anisotropy to the rubber constituting the tread, by which braking performance on a dry road surface can be reconciled with that on a wet road surface at high levels. When the groove area ratio of the tread 24 is less than 30%, the resulting tire will be poor in braking performance on a wet road surface. When it exceeds 40%, the tire will be poor in braking performance on a dry road surface.

It is necessary that the ratio of the tire circumferential modulus (b) of the tread 24 to the tire radial modulus (a) thereof (i.e., b/a ratio) is adjusted to 1.2 or above, preferably 1.5 or above. When the ratio is less than 1.2, it will be difficult to reconcile braking performance on a dry road surface with that on a wet road surface at high levels. Further, the b/a ratio depends also on hardness of the tread rubber, loadings of the short fiber, extrusion process of the tread and so on. The upper limit thereof is about 10.

When the fibrillated short fiber (A') is used alone for tread rubber, the short fiber (A') is incorporated into the tread rubber in an amount of 0.5 to 15 parts by weight per 100 parts by weight of the rubber. When the amount of the fibrillated short fiber (A') is less than 0.5 part by weight, it will be difficult to adjust the ratio of the tire circumferential modulus (b) of the tread 24 to the tire radial modulus (a) thereof (i.e., b/a ratio) to 1.2 or above. When the amount exceeds 15 parts by weight, the resulting rubber composition will be very poor in processability in kneading and extrusion. It is to be noted that the amount of the short fiber (A) added is substantially equal to the amount of the fibrillated short fiber (A') incorporated.

For hybridizing the fibrillated short fiber (A') with the short fiber (B), the amount of the fibrillated short fiber (A') incorporated is adjusted to 0.5 to 10 parts by weight per 100 parts by weight of the rubber, while that of the short fiber (B) incorporated is adjusted to 1 to 15 parts by weight. When the total amount of the short fibers (A') and (B) incorporated is less than 1.5 parts by weight, it will be difficult to adjust the ratio of the tire circumferential modulus (b) of the tread 24 to the tire radial modulus (a) thereof (i.e., b/a ratio) to 1.2 or above. When the total amount exceeds 25 parts by weight, the resulting rubber composition will be very poor in processability in kneading and extrusion.

Figure 5:
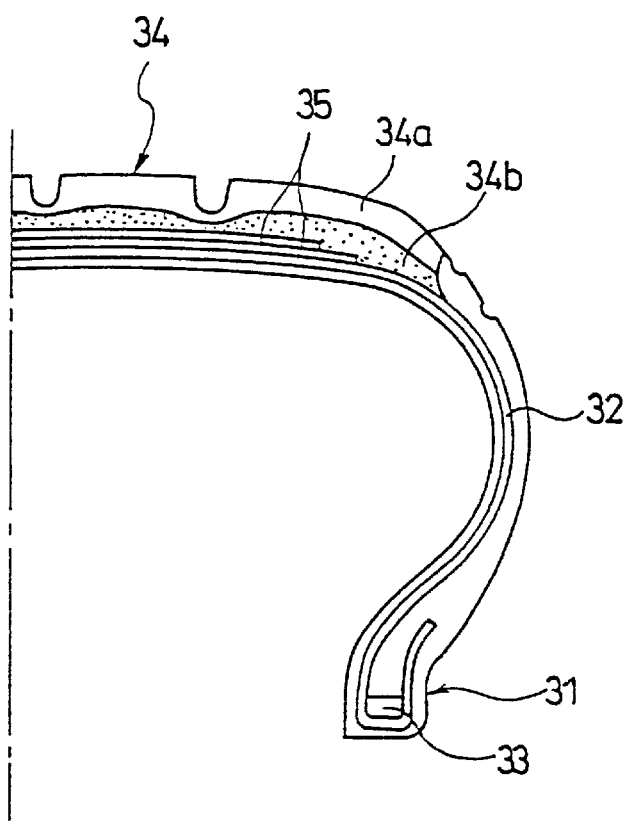
FIG. 5 is a meridional half sectional view showing the pneumatic tire according to the third embodiment of the present invention.

FIG. 5 shows an example of the pneumatic tire according to the third embodiment of the present invention. In FIG. 3, a carcass layer 32 containing a plurality of reinforcement cords in a state arranged in the radial direction bridges a pair of, i.e., lefthand and righthand bead portions 31, 31, and both tire widthwise end portions of the carcass layer 32 are wound up around the bead cores 33 respectively from the tire inner side to the tire outer side. Two belt layers 35, 35 each containing a plurality of reinforcement cords are laid in the tread portion 34 on the outside of the carcass layer 32. These belt layers 35, 35 are arranged in such a way that the reinforcement cords are arranged obliquely to the tire circumferential direction and that the reinforcement cords contained in one of the layers 35, 35 cross those contained in the other layer.

The tread portion 34 takes a laminate structure constituted of at least two layers comprising a cap tread 34a lying on the tire outer side and an under tread 34b lying on the tire inner side, the cap tread 34a being made of a rubber excellent in wet performance and the under tread 34b being made of a rubber exhibiting a low energy loss for the purpose of lowering the rolling resistance. The energy loss of the under tread 34b can be reduced by decreasing the loadings of carbon black or by using a rubber composition excellent in impact resilience.

The ratio of the tire circumferential modulus (b) of the under tread 34b to the tire widthwise modulus (a) thereof (i.e., b/a ratio) is adjusted to 1.5 or above by incorporating a short fiber (A') formed by the fibrillation of a short fiber (A) whose cross section takes a sea-island structure essentially composed of at least two polymers and, if necessary, a short fiber (B) made of a thermoplastic polymer having amido groups in the main chain into the rubber constituting the under tread 34b and orienting the fibrillated short fiber (A') or the hybridized short fibers (A') and (B) in a tire circumferential direction.

The incorporation of a short fiber (A') formed by the fibrillation of a short fiber (A) whose cross section takes a sea-island structure essentially composed of at least two polymers into the rubber constituting the under tread 34b in a specific amount makes it possible to inhibit rubber flow during the molding of the tire with vulcanization to give an improvement in the uniformity of the gauge, even when the under tread 34b is made by using a rubber exhibiting a low energy loss for the purpose of lowering the rolling resistance of the tire. Further, the resulting vulcanized tire is improved in stability in steering by virtue of the high reinforcing effect due to the fibrillated short fiber (A') oriented in a tire circumferential direction.

It is necessary that the ratio of the tire circumferential modulus (b) of the under tread 34b to the tire widthwise modulus (a) thereof (i.e., b/a ratio) is adjusted to 1.5 or above, preferably 2.0 or above. When the b/a ratio is less than 1.5, the hoop effect in the tire circumferential direction will be too poor to improve the stability in steering. Further, the b/a ratio depends also on hardness of the rubber, loadings of the short fiber, extrusion process of the sheet and so on. The upper limit thereof is about 10.

In this embodiment, the under tread rubber exhibits little rubber flow during the molding of the tire with vulcanization, so that the thickness of the under tread 34b can be increased as compared that of the prior art to thereby further lower the rolling resistance. It is preferable that the volume ratio of the under tread 34b to the tread portion 34 range from 25 to 40%. When the volume ratio is less than 25%, the rolling resistance will not sufficiently be lowered. When it exceeds 40%, the thickness of the cap compound will be smaller than the groove depth of the tread, so that the under tread will come out to the surface in the last stage of wear. The term "volume ratio of an under tread" used in this specification refers to a ratio of the volume of an under tread to the total volume of a cap tread and an under tread.

It is also preferable to incorporate carbon black having an iodine absorption of 30 to 60 mg/g to the rubber constituting the under tread 34b in an amount of 25 to 60 parts by weight per 100 parts by weight of the rubber. The use of such coarse carbon black in the above amount can inhibit the rise of tan δ. Further, it is also preferable that the Mooney viscosity of the rubber be 80 or below as determined in a state containing the short fiber, carbon black and other additives. Good processability can be secured by adjusting the Mooney viscosity to 80 or below.

When the fibrillated short fiber (A') is used alone for the rubber constituting the under tread 34b, the short fiber (A') is incorporated into the rubber in an amount of 1 to 15 parts by weight per 100 parts by weight of the rubber. When the amount of the fibrillated short fiber (A') is less than one part by weight, it will be difficult to adjust the ratio of the tire circumferential modulus (b) of the under tread 34b to the tire radial modulus (a) thereof (i.e., b/a ratio) to 1.5 or above. When the amount exceeds 15 parts by weight, the resulting rubber composition will be very poor in processability in kneading and extrusion. It is to be noted that the amount of the short fiber (A) added is substantially equal to that of the fibrillated short fiber (A') incorporated.

For hybridizing the fibrillated short fiber (A') with the short fiber (B), the amount of the fibrillated short fiber (A') incorporated is adjusted to 1 to 12 parts by weight per 100 parts by weight of the rubber, while that of the short fiber (B) incorporated is adjusted to 1 to 10 parts by weight. When the total amount of the short fibers (A') and (B) incorporated is less than 2 parts by weight, it will be difficult to adjust the ratio of the tire circumferential modulus (b) of the under tread 34b to the tire radial modulus (a) thereof (i.e., b/a ratio) to 1.5 or above. When the total amount exceeds 22 parts by weight, the resulting rubber composition will be very poor in processability in kneading and extrusion.

Figure 6:
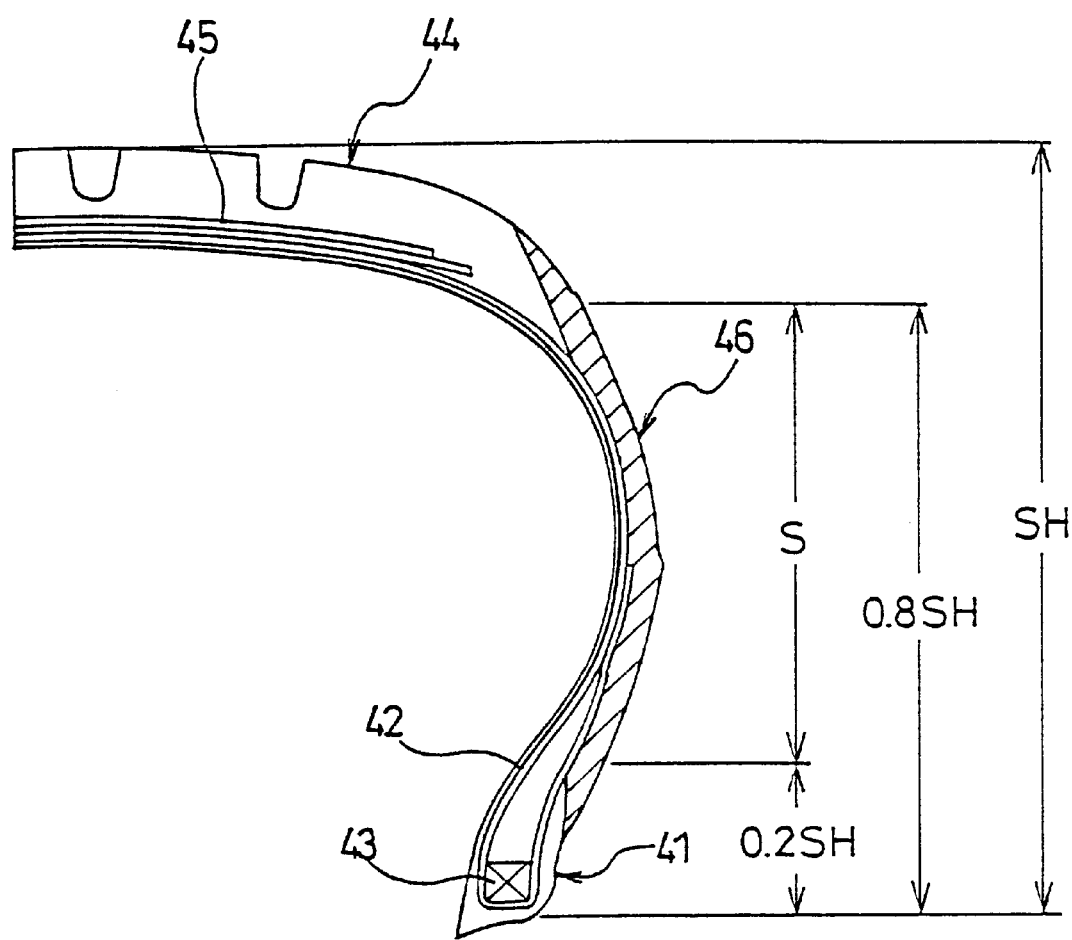
FIG. 6 is a meridional half sectional view showing an example of the pneumatic tire according to the fourth embodiment of the present invention.

FIG. 6 shows an example of the pneumatic tire according to the fourth embodiment of the present invention. In FIG. 6, a carcass layer 42 bridges a pair of, i.e., lefthand and righthand bead portions 41, 41, and both tire widthwise end portions of the carcass layer 42 are wound up around the bead cores 43 respectively from the tire inner side to the tire outer side. Further, a plurality of belt layers 45 each containing a plurality of reinforcement cords in a state arranged obliquely to the tire circumferential direction are laid in the tread portion 44 on the outer peripheral side of the carcass layer 42 in such a way that the reinforcement cords contained in one of the belt layers 45 cross those contained in the other layer.

The sidewall 46 located between the bead portion 41 and the tread portion 44 is made of a rubber composition containing a short fiber (A') formed by the fibrillation of a short fiber (A) whose cross section takes a sea-island structure essentially composed of at least two polymers and, if necessary, a short fiber (B) made of a thermoplastic polymer having amido groups in the main chain, with the fibrillated short fiber (A') or the hybridized short fibers (A') and (B) being oriented in a direction parallel to the face of the sidewall 46.

The above incorporation into the rubber constituting the sidewall 46 of a short fiber (A') formed by the fibrillation of a short fiber (A) whose cross section takes a sea-island structure essentially composed of at least two polymers and, if necessary, a short fiber (B) made of a thermoplastic polymer having amido groups in the main chain can effectively reinforce the sidewall 46, which makes it possible to decrease the gauge of the sidewall 46 without lowering the resistance to external damage, thus giving a lightweight tire.

A rubber composition reinforced with the above short fiber may constitute at least a part of the sidewall 46. More specifically, it is preferable that the rubber composition be laid in a region S spreading between the lines corresponding respectively to 20% and 80% of the tire sectional height (SH). When the region S in which the short fiber reinforced rubber composition is laid is narrower than the above range, it will be difficult to secure satisfactory resistance to external damage. In order to attain a sufficient reinforcing effect, it is also preferable that the thickness of the layer made of the short fiber reinforced rubber composition account for at least 40% of the sidewall thickness.

Figure 7:
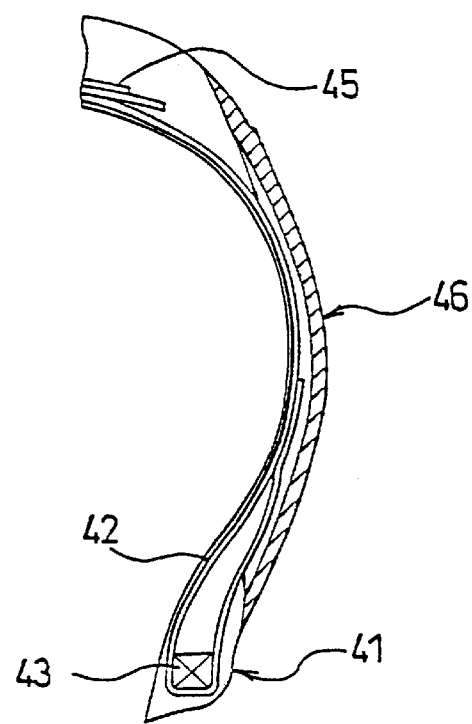
FIG. 7 is a meridional half sectional view showing a modification example of the pneumatic tire according to the fourth embodiment of the present invention.
Figure 8:
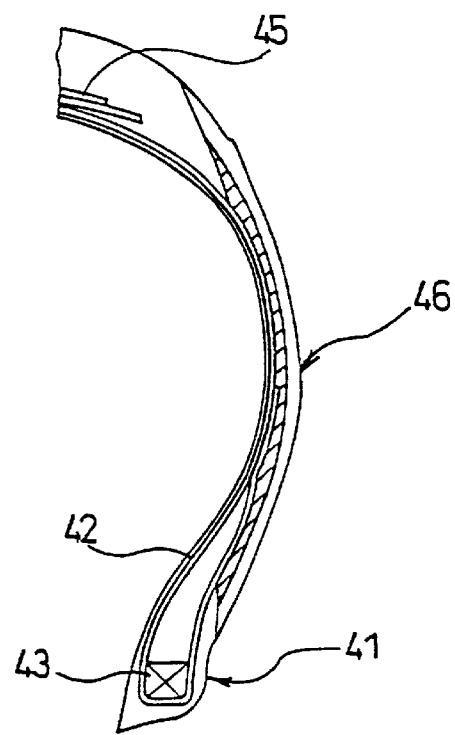
FIG. 8 is a meridional half sectional view showing another modification example of the pneumatic tire according to the fourth embodiment of the present invention.

With respect to the thickness direction of the sidewall 46, as shown in FIG. 6, the entire sidewall 46 may be made of the short fiber reinforced rubber composition. Alternatively, as shown in FIG. 7, the short fiber reinforced rubber composition may be laid only in the tire outer portion of the sidewall 46, or as shown in FIG. 8, it may be laid only in the tire inner portion thereof.

When the fibrillated short fiber (A') is to be used alone for the sidewall rubber, the short fiber (A') is incorporated into the rubber in an amount of 0.5 to 15 parts by weight per 100 parts by weight of the rubber. When the amount of the fibrillated short fiber (A') is less than 0.5 part by weight, no satisfactory reinforcing effect will be attained. When the amount exceeds 15 parts by weight, the resulting rubber composition will be very poor in processability in kneading and extrusion. It is to be noted that the amount of the short fiber (A) added is substantially equal to that of the fibrillated short fiber (A') incorporated.

For hybridizing the fibrillated short fiber (A') with the short fiber (B), the amount of the fibrillated short fiber (A') incorporated is adjusted to 0.5 to 10 parts by weight per 100 parts by weight of the rubber, while that of the short fiber (B) incorporated is adjusted to 1 to 15 parts by weight. When the amount of the short fiber (B) incorporated is less than one part by weight, the resistance to crack growth will not sufficiently be improved. When the amount of the fibrillated short fiber (A') exceeds 10 parts by weight and the amount of the short fiber (B) exceeds 15 parts by weight, the resulting rubber composition will be very poor in processability in kneading and extrusion.

Figure 9:
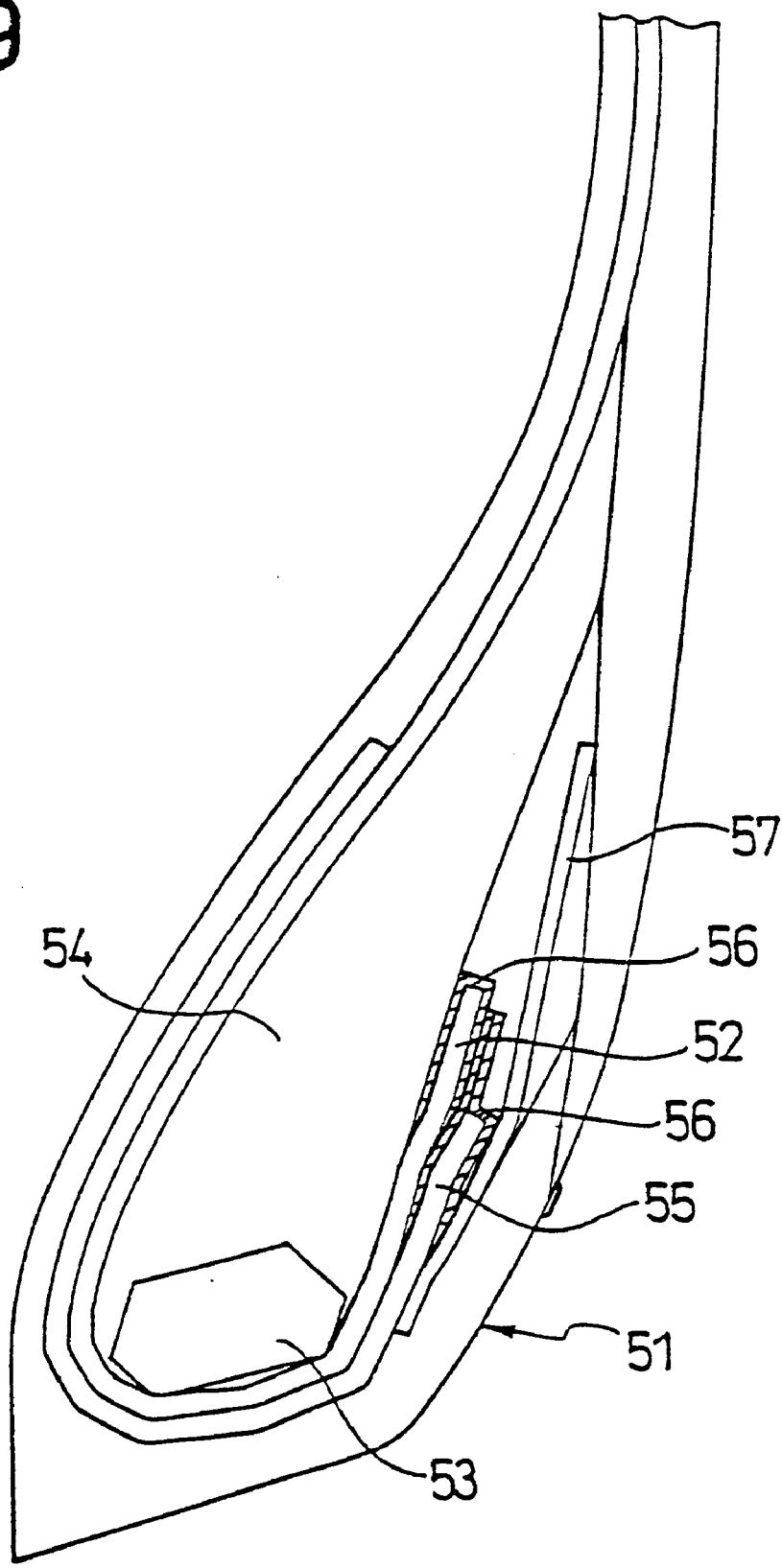
FIG. 9 is a sectional view showing an example of the bead portion of the heavy-duty pneumatic radial tire according to the fifth embodiment of the present invention.
Figure 10:
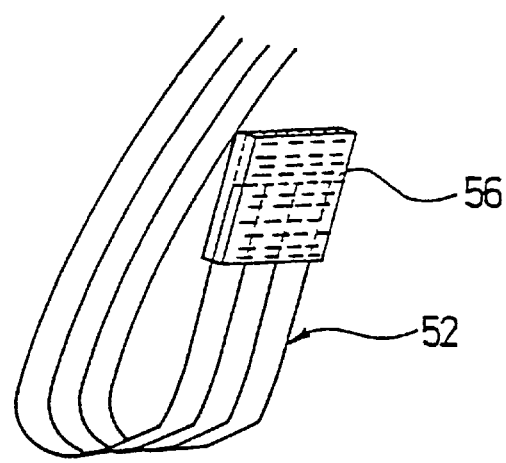
FIG. 10 is a perspective view showing the wound-up portion of the carcass layer shown in FIG. 9.

FIG. 9 shows an example of the bead portion of the heavy-duty pneumatic radial tire according to the fifth embodiment of the present invention, and FIG. 10 shows the wound-up portion of the carcass layer. In FIGS. 9 and 10, a carcass layer 52 containing a plurality of reinforcement cords in a state arranged in the tire radial direction bridges a pair of, i.e., lefthand and righthand bead portions 51, 51, and the tire widthwise end portions of the carcass layer 52 are wound up around the bead cores 53 respectively from the tire inner side to the tire outer side. Further, bead fillers 54 made of a hard rubber are laid on the radial outer sides of the bead cores 53, and enveloped in the wound-up portions of the carcass layer 52 respectively.

In the bead portion 51, a steel cord reinforced layer 55 containing a plurality of steel cords in a state arranged in the tire radial direction is laid along the carcass layer 52, and the tire outer upper end portion of the steel cord reinforced layer 55 is terminated in the neighborhood of the wound-up portion of the carcass layer 52. Further, a short fiber reinforced layer 56 is laid in the wound-up portion of the carcass layer 52 and the upper end portion of the steel cord reinforced layer 55 as the edge cover covering both of the portions. Further, an organic fiber cord reinforced layer 57 containing a plurality of organic fiber cords (such as nylon cords) in a state arranged obliquely to the tire circumferential direction is also laid on the tire outer sides of the wound-up portion of the carcass layer 52 and the upper end portion of the steel cord reinforced layer 55.

The ratio of the tire circumferential modulus (b) of the short fiber reinforced layer 56 to the tire radial modulus (a) thereof (i.e., b/a ratio) is adjusted to 1.2 or above by incorporating a short fiber (A') formed by the fibrillation of a short fiber (A) whose cross section takes a sea-island structure essentially composed of at least two polymers and, if necessary, a short fiber (B) made of a thermoplastic polymer having amido groups in the main chain into the rubber constituting the short fiber reinforced layer 56 and orienting the fibrillated short fiber (A') or the hybridized short fibers (A') and (B) in a tire circumferential direction.

The above anisotropic short fiber reinforced layer 56 lying over the wound-up portion of the carcass layer 52 and the upper end portion of the steel cord reinforced layer 55 can effectively inhibit the tire circumferential movement of the cords arranged in the tire radial direction, so that the stress concentration in the wound-up end portion of the carcass layer 52 and the upper end portion of the steel cord reinforced layer 55 can be relaxed with a decrease in the rubber volume of the bead portion 51. Thus, the anisotropic short fiber reinforced layer 56 can inhibit the delamination among cords to thereby improve the durability of the tire.

Figure 11:
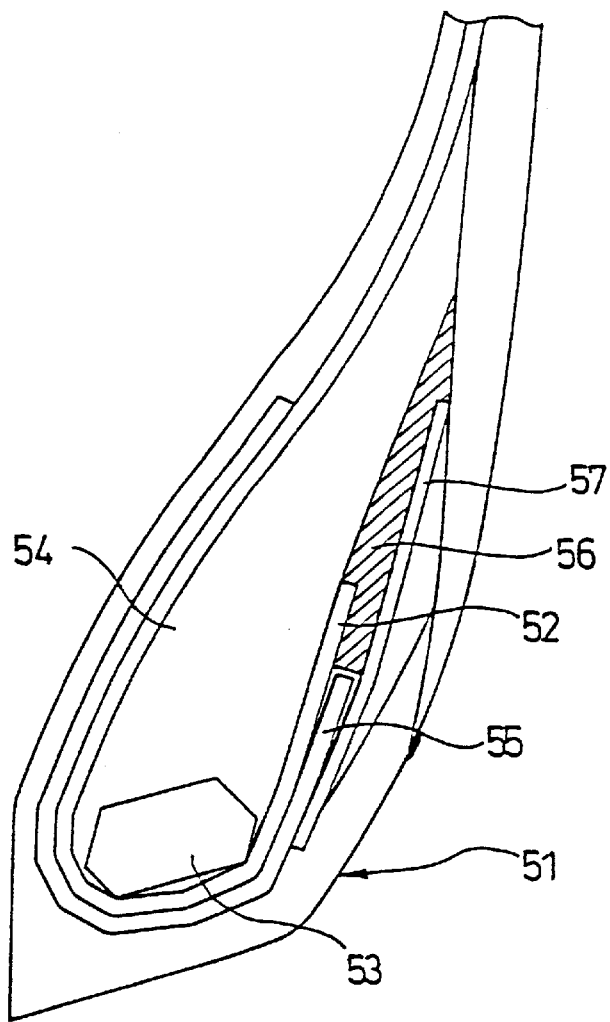
FIG. 11 is a sectional view showing a modification example of the bead portion of the heavy-duty pneumatic radial tire according to the firth embodiment of the present invention.

FIG. 11 shows a modification example of the bead portion of the heavy-duty pneumatic radial tire according to the fifth embodiment of the present invention. In this embodiment, the same members as those shown in FIG. 9 are referred to as the same reference numerals as those used in FIG. 9 respectively, and a detailed description thereof is omitted. In FIG. 11, a short fiber reinforced layer 56 is laid in the wound-up end portion of the carcass layer 52. This short fiber reinforced layer 56 is located between the bead filler 54 and the organic fiber cord reinforced layer 57, and laid over the region spreading toward the tire radial outside in a tire radial width of 60 mm from the upper end portion of the steel cord reinforced layer 55 as a reinforcement for the bead portion 51.

The above anisotropic short fiber reinforced layer 56 lying over the region spreading toward the tire radial outside from the neighborhood of the wound-up end portion of the carcass layer 52 as well as that used in the embodiment shown in FIG. 9 not only improves the durability of the tire but also makes it possible to secure excellent-stability in steering with a decrease in the rubber volume of the bead portion 51.

Although the short fiber reinforced layer 56 is required to lie at least in the neighborhood of the wound-up end of the carcass layer 52, the form of arrangement thereof is not particularly limited. Specifically, the layer 56 may be used as an edge cover or as reinforcement for securing the stability in steering.

It is necessary that the ratio of the tire circumferential modulus (b) of the short fiber reinforced layer 56 to the tire radial modulus (a) thereof (i.e., b/a ratio) is adjusted to 1.2 or above, preferably 1.5 or above. When the ratio is less than 1.2, it will be difficult to attain an efficacious reinforcing effect. Further, the b/a ratio depends also on hardness of the rubber, loadings of the short fiber, extrusion process of the short fiber reinforced layer 56 and so on. The upper limit thereof is about 10.

When the fibrillated short fiber (A') is to be used alone for the rubber constituting the short fiber reinforced layer 56, the short fiber (A') is incorporated into the rubber in an amount of 0.5 to 15 parts by weight per 100 parts by weight of the rubber. When the amount of the fibrillated short fiber (A') is less than 0.5 part by weight, it will be difficult to adjust the ratio of the tire circumferential modulus (b) of the short fiber reinforced layer 56 to the tire radial modulus (a) thereof (i.e., b/a ratio) to 1.2 or above. When the amount exceeds 15 parts by weight, the resulting rubber composition will be very poor in processability in kneading and extrusion. It is to be noted that the amount of the short fiber (A) added is substantially equal to that of the fibrillated short fiber (A') incorporated.

For hybridizing the fibrillated short fiber (A') with the short fiber (B), the amount of the fibrillated short fiber (A') incorporated is adjusted to 0.5 to 10 parts by weight per 100 parts by weight of the rubber, while that of the short fiber (B) incorporated is adjusted to 1 to 15 parts by weight. When the total amount of the fibrillated short fiber (A') and short fiber (B) incorporated is less than 1.5 parts by weight, it will be difficult to adjust the ratio of the tire circumferential modulus (b) of the short fiber reinforced layer 56 to that tire radial modulus (a) thereof (i.e., b/a ratio) to 1.2 or above. When the total amount exceeds 25 parts by weight, the resulting rubber composition will be very poor in processability in kneading and extrusion.

Figure 12:
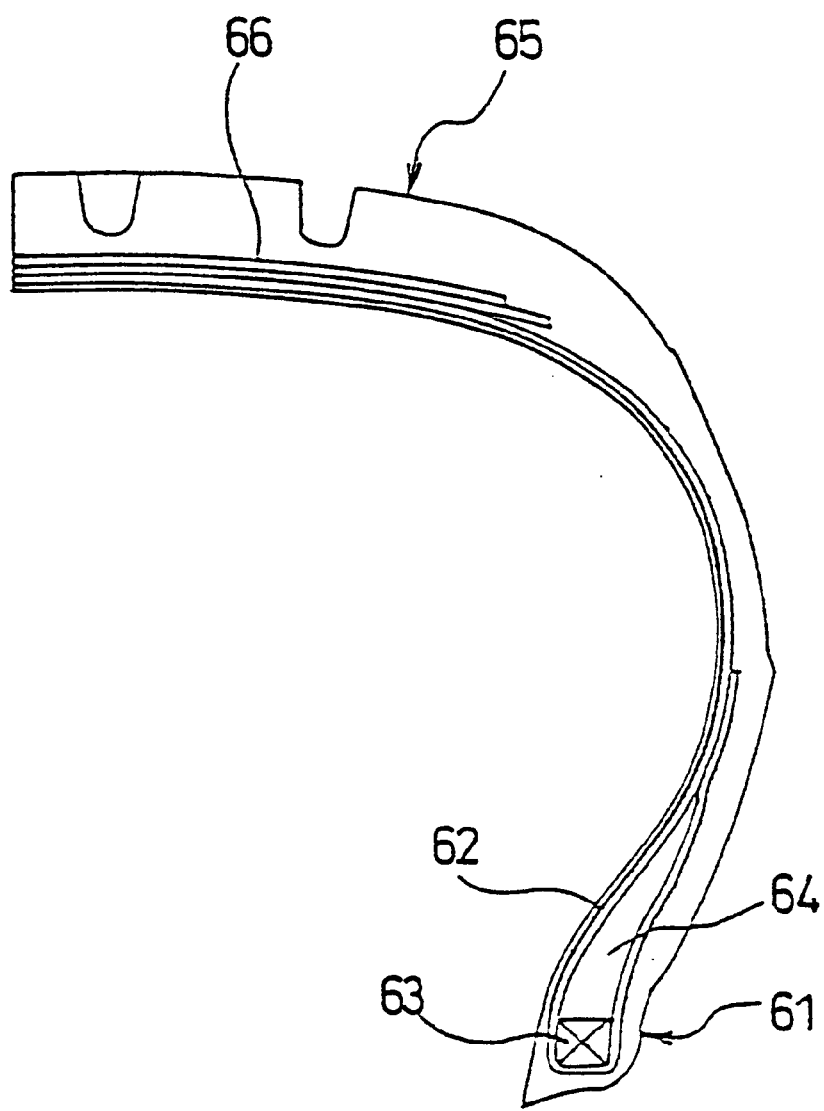
FIG. 12 is a meridional half sectional view showing an example of the pneumatic radial tire according to the sixth embodiment of the present invention.

FIG. 12 shows an example of the pneumatic radial tire according to the sixth embodiment of the present invention. In FIG. 12, a carcass layer 62 containing a plurality of reinforcement cords in a state arranged in the radial direction briges a pair of, i.e., lefthand and righthand bead portions 61, 61, and the tire widthwise end portions of the carcass layer 62 are wound up around the bead cores 63 respectively from the tire inner side to the tire outer side. A bead filler 64 is located on the outer peripheral side of the bead core 63, and enveloped in the wound-up portion of the carcass layer 62. Further, two belt layers 66, 66 each containing a plurality of steel cords are laid in the tread portion 65 on the outside of the carcass layer 62. These belt layers 66, 66 are arranged in such a way that the reinforcement cords are arranged obliquely to the tire circumferential direction and that the reinforcement cords contained in one of the layers 66, 66 cross those contained in the other layer.

The rubber constituting the bead filler 64 contains a short fiber (A') formed by the fibrillation of a short fiber (A) whose cross section takes a sea-island structure essentially composed of at least two polymers and, if necessary, a short fiber (B) made of a thermoplastic polymer having amido groups in the main chain, with the fibrillated short fiber (A') or the hybridized short fibers (A') and (B) being oriented in a direction perpendicular to the tire radial direction, by which the ratio of the storage modulus (b) of the bead filler 64 in the direction of orientation of the short fiber to the tire radial storage modulus (a) thereof (i.e., b/a ratio) is adjusted to 4 to 10.

Figure 13:
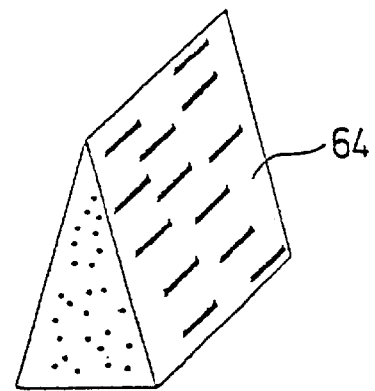
FIG. 13 is a perspective sectional view showing an example of the bead filler according to the embodiment shown in FIG. 12.
Figure 14:
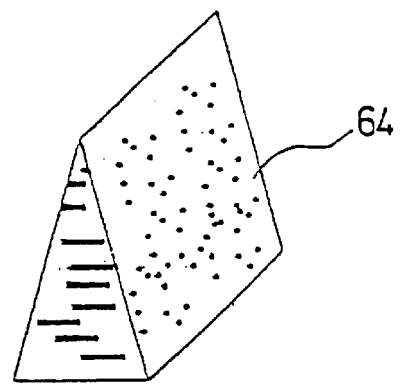
FIG. 14 is a perspective sectional view showing a modification example of the bead filler according to the embodiment shown in FIG. 12.
Figure 15:
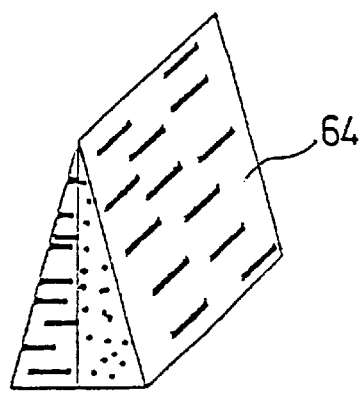
FIG. 15 is a perspective sectional view showing another modification example of the bead filler according to the embodiment shown in FIG. 12.

The short fiber contained in the bead filler 64 may be oriented in the tire cicumferential direction as shown in FIG. 13, or in the tire rotating shaft direction as shown in FIG. 14. Alternatively, the bead filler 64 may take a structure constituted of two layers laminated in the tire rotating shaft direction as shown in FIG. 15, one (64a) of the layers containing the short fiber in a state oriented in the tire circumferential direction and the other (64b) containing it in a state oriented in the tire rotating shaft direction. The use of the two-layer bead filler 64 shown in FIG. 15 enables such a design that both the rigidity of the bead portion 61 in the tire circumferential direction and that in the tire rotating shaft direction fall in their respective suitable ranges The anisotropic bead filler 64 located on the outer peripheral side of the bead core 63 can selectively enhance the rigidity in the tire circumferential or tire axial direction, which brings about an improvement in the comfortableness in riding and a decrease in the tire weight with the stability in steering being kept at a level equivalent or superior to that of a tire provided with steel reinforcements in the neighborhood of the bead fillers. It is necessary that the ratio of the storage modulus (b) of the bead filler 64 in the direction of orientation of the short fiber to the tire radial storage modulus (a) thereof (i.e., b/a ratio) is adjusted to 4 or above, preferably 6 or above. When the b/a ratio is less than 4, it is difficult to reconcile stability in steering with comfortableness in riding. The b/a ratio depends also on hardness of the rubber, loadings of the short fiber, extrusion process of the sheet or the like. The upper limit thereof is 10.

When the fibrillated short fiber (A') is to be used alone for the rubber constituting the bead filler 64, the amount of the short fiber (A'). incorporated is adjusted to 3 to 15 parts by weight, preferably 5 to 15 parts by weight per 100 parts by weight of the rubber. When the amount is less than 3 parts by weight, it will be difficult to adjust the ratio of the storage modulus (b) of the bead filler 64 in the direction of orientation of the short fiber to the tire radial storage modulus (a) thereof (i.e., b/a ratio) to 4 or above. When the amount exceeds 15 parts by weight, the resulting rubber composition will be very poor in processability in kneading and extrusion. It is to be noted that the amount of the short fiber (A) added is substantially equal to that of the fibrillated short fiber (A') incorporated.

For hybridizing the fibrillated short fiber (A') with the short fiber (B), the amount of the fibrillated short fiber (A') incorporated is adjusted to 3 to 10 parts by weight per 100 parts by weight of the rubber, while that of the short fiber (B) incorporated is adjusted to 1 to 15 parts by weight. When the total amount of the short fibers (A') and (B) incorporated is less than 4 parts by weight, it will be difficult to adjust the ratio of the storage modulus (b) of the bead filler 64 in the direction of orientation of the short fiber to the tire radial storage modulus (a) thereof (i.e., b/a ratio) to 4 or above. When the total amount exceeds 25 parts by weight, the resulting rubber composition will be very poor in processability in kneading and extrusion.

In the present invention, the rubber member into which the fibrillated short fiber (A') is incorporated is made from at least one rubber. Although this rubber is not particularly limited, examples of the rubber include: diene rubbers and hydrogenated derivatives thereof such as natural rubbers (NR), polyisoprene rubbers (IR), epoxidized natural rubbers (ENR), styrene/butadiene copolymer rubbers (SBR), polybutadiene rubbers (high-cis BR and low-cis BR), nitrile rubbers (NBR), hydrogenated NBR and hydrogenated SBR; and various elastomers such as olefin rubbers, example, ethylene/propylene rubbers (EPDM and EPM), maleic acid-modified ethylene/propylene rubbers (M-EPM), butyl rubbers (IIR) and isobutylene/(aromatic vinyl or diene) copolymers, halogenated rubbers, for example, brominated butyl rubbers (Br-IIR), chlorinated butyl rubbers (Cl-IIR), brominated isobutylene/p-methylstyrene copolymers (Br-IPMS), chlorosulfonated polyethylene (CMS), chlorinated polyethylene (CM) and maleic acid-modified chlorinated polyethylene (M-CM), and thermoplastic elastomers, for example, styrene elastomers, olefin elastomers and ester elastomers.

Also it is necessary that the short fiber (A) is essentially composed of at least two polymers which are not compatible with each other but form a sea-island structure in the cross section thereof and has such fibrillability that the sea component and the island component can be separated from each other by mechanical shear force to give finer fibers, even though the polymers constituting the short fiber (A) are not particularly limited. The polymers constituting the short fiber (A) include polyester, polyvinyl alcohol, nylon, polyethylene, polypropylene, cellulose, polybutadiene, aromatic polyamide, rayon, polyarylate, poly(p-phenylenebenzobisoxazole), poly(p-phenylene-benzobisthiazole) and so on.

The addition of the above fibrillable short fiber (A) to the rubber exhibits only a little "intertwist" of the fiber by virtue of the low aspect ratio of the fiber (the term "aspect ratio" being a ratio of fiber length to the diameter of a circle having an area equivalent to the sectional area of the fiber), so that the fiber can be well dispersed in the rubber. Then, the short fiber (A) is fibrillated by separating the sea component from the island component by mechanical shear force, and the short fiber (A') formed by the fibrillation has an increased area of contact with the rubber to exhibit a high rubber reinforcing effect. The fibrillation of the short fiber (A) may be conducted by division (diameter reduction) over the whole section or by diameter reduction only in the periphery or both end portions of the fiber with the core remaining unfibrillated.

It is preferable that the short fiber (A) have an average length of 1 to 5000 $\mu$m. When the average length of the short fiber (A) is less than 1 $\mu$m, the resulting rubber will not exhibit satisfactory anisotropy. When it exceeds 5000 $\mu$m, the resulting rubber composition will be very poor in processability in kneading and extrusion. Further, it is preferable that the fibrillated short fiber (A') have an average diameter of 0.05 to 5.0 $\mu$m, still preferably 0.1 to 2 $\mu$m. When the average diameter of the fibrillated short fiber (A') is less than 0.05 $\mu$m, not only a prolonged kneading time will be necessary, but also fibrillation into such too fine fibers will not give any additional reinforcing effect. On the contrary, when the average diameter exceeds 5.0 $\mu$m, the resulting fiber will not exhibit satisfactory affinity for the rubber owing to the insufficient fibrillation, so that the resulting rubber composition will be liable to cause cracking.

A preferable example of the short fiber (A) to be used in the present invention is a short fiber at least comprising a polyvinyl alcohol polymer (X) and a water-insoluble polymer (Y) at an X/Y weight ratio of 90/10 to 20/80 and having a sea-island structure wherein one of X and Y is present as the island component and the other thereof is present as the sea component. In this short fiber, a sea-island structure is formed by a combination of a polyvinyl alcohol polymer (X), which is a water-soluble polymer with a water-insoluble polymer (Y) (such as cellulose acetate or starch) which is not dissolved in water even when immersed in water at ordinary temperature. A polyvinyl alcohol polymer exhibits high strength and excellent affinity for rubbers. When the content of the polyvinyl alcohol polymer (X) in the short fiber exceeds 90% by weight, the resulting short fiber will not be divided by mechanical shear force applied during the kneading of the rubber composition. When it is less than 20% by weight, no reinforcing effect will be attained.

Alternatively, an acrylonitrile polymer may be used as the water-insoluble polymer (Y) together with the above polyvinyl alcohol polymer (X). Such a combination of a polyvinyl alcohol polymer with an acrylonitrile polymer is desirable in respects of the division (diameter reduction) of the fiber and strength. The production of a polyvinyl alcohol fiber is conducted by solvent spinning which is a representative wet spinning process, and dimethyl sulfoxide (DMSO) is sometimes used as the solvent for a dope. In such a case, the combination of a polyvinyl alcohol polymer with an acrylonitrile polymer is preferable from the standpoint of easiness in preparation, because an acrylonitrile polymer is also soluble in DMSO.

The above polyvinyl alcohol polymer (X) may be any of completely and partially saponified ones and copolymers. The acrylonitrile polymer to be used in the present invention may be any one containing at least 70 mole % of acrylonitrile. For example, the acrylonitrile polymer may be one prepared by copolymerizing acrylonitrile with a (meth) acrylate ester such as methyl acrylate, ethyl acrylate or methyl methacrylate, a vinyl ester such as vinyl acetate or vinyl butyrate, a vinyl compound such as vinyl chloride, an unsaturated carboxylic acid such as acrylic acid, methacrylic acid or maleic anhydride, a sulfonated vinyl compound, a monomer covulcanizable with rubbers (such as butadiene or isoprene) or the like. Further, it is preferable in order to enhance the solubility in the solvent of a dope that the acrylonitrile polymer to be used in the present invention be not PAN homopolymer but acrylonitrile copolymers containing other comonomer in an amount of 0.5 to 10 mole %, still preferably 2 to 8 mole %.

Prior to the addition of the short fiber (A) to the rubber, the short fiber (A) may be surface-treated by dipping into a rubber latex, a liquid rubber, a liquid resin, a water-soluble resin, a thermoplastic resin or the like, for the purpose of enhancing the binding between the fibers to thereby accelerate the dispersion thereof in the rubber. Further, bonding compounds such as phenolic compounds and methylene donors may be added to the rubber in order to improve the bonding between the short fiber (A) and the rubber through vulcanization.

Examples of the phenolic compounds include resorcinol, β-naphthol and resorcinol/aldehyde condensates (resorcin resins), m-cresol/aldehyde condensates (m-cresol resins), phenol/aldehyde condensates (phenolic resins) and condensates of other phenolic organic compounds with aldehydes. Examples of the methylene donors include hexamethylenetetramine, hexamethoxymethylolmelamine, paraformaldehyde, acetaldehyde/ammonia, α-polyoxymethylene, polymethylolacetyleneurea, and derivatives thereof.

The fibrillated short fiber (A') is excellent in affinity for rubbers, so that no problem occurs even when these additives are not used. When the above phenolic compound and methylene donor are used, it is preferable that the amount of the former be adjusted to 10 parts by weight or below, still preferably 6 parts by weight or below per 100 parts by weight of the rubber, while that of the latter be adjusted to 10 parts by weight or below, still preferably 5 parts by weight or below per 100 parts by weight thereof. When the amounts exceed the upper limits respectively, unfavorably the resulting rubber composition will be poor in processability and in elongation at break. In addition to these additives, other bonding compounds may be added, and such bonding compounds include silane coupling agents, titanate coupling agents, unsaturated carboxylic acids and derivatives thereof, epoxy resins, epoxidized liquid oligomers and polymers, maleic anhydride-modified liquid oligomers and polymers, and blocked isocyanates.

The above fibrillated short fiber (A') can remarkably enhance the modulus at low elongation, but it little enhances the modulus at high elongation. It is therefore preferable to add a short fiber (B) made of a thermoplastic polymer having amido groups in the main chain in addition to the above fibrillated short fiber (A'). This short fiber (B) can remarkably enhance the modulus at high elongation, so that the hybridization of the fibrillated short fiber (A') with the short fiber (B) makes it possible to enhance both the modulus at low elongation and that at high elongation simultaneously. Enhancement in the modulus at high elongation makes it possible to inhibit the initiation and growth of cracks due to flex fatigue, thus bringing about an improvement in the resistance to crack growth.

The above short fiber (B) is made of a thermoplastic polymer having amido groups in the main chain. It is preferable that the average diameter of the short fiber (B) lie within the range of 0.05 to 5.0 μm. The short fiber (B) is incorporated into the rubber by preparing a composition which comprises the short fiber (B) and a matrix made of a rubber and/or a polyolefin and wherein the short fiber (B) is dispersed in the matrix and chemically bonded to the matrix and adding this composition to the rubber. Examples of such a composition containing the short fiber (B) include the following items (i), (ii) and (iii).

(i) Reinforced rubber compositions each comprising 100 parts by weight of a vulcanizable rubber and 1 to 100 parts by weight of a fine short fiber made of a thermoplastic polymer having amido groups in the molecule, wherein the fine short fiber is embedded in the rubber and the polymer is grafted onto the vulcanizable rubber at the interface of the fiber through a novolak base phenol/formaldehyde precondensate (see Japanese Patent Laid-open No. 43041/1984).

Examples of the novolak-base phenol/formaldehyde precondensate include soluble and fusible resins obtained by condensing a phenol such as phenol or bisphenol with formaldehyde (or paraformaldehyde) in the presence of an acid catalyst such as sulfuric acid, hydrochloric acid, phosphoric acid or oxalic acid and modifications thereof.

(ii) Fiber-reinforced thermoplastic compositions each comprising a matrix made of a polyolefin and an elastomer and a thermoplastic polyamide dispersed in the matrix in the form of a fine fiber chemically bonded to the matrix through a silane coupling agent (see Japanese Patent Laid-open No. 278360/1995).

Examples of such a silane coupling agent include vinylalkoxysilanes, such as vinyltrimethoxysilane, vinyltriethoxysilane and vinyltris (β-methoxyethoxy)-silane, vinyltriacetylsilane, γ-methacryloxypropyl-trimethoxysilane, γ-[N-(β-methacryloxyethyl)-N,N- dimethylammonium(chloride)]propylmethoxysilane, N-β-(aminoethyl)-γ-aminopropyltrimethoxysilane, styryldiaminosilane, and γ-ureidopropyltriethoxysilane.

(iii) Reinforced rubber compositions each comprising 100 parts by weight of a vulcanizable rubber and 1 to 70 parts by weight of a fine nylon fiber having an average diameter of 0.05 to 0.8 μm, wherein the fine fiber is embedded in the vulcanizable rubber and the nylon is grafted onto the vulcanizable rubber at the interface of the fiber through a resol-base alkylphenol/formaldehyde precondensate (see Japanese Patent Laid-open No. 79037/1983).

Examples of the resol-base alkylphenol/formaldehyde precondensate include those obtained by reacting an alkylphenol such as cresol with formaldehyde or acetaldehyde in the presence of an alkali catalyst and modifications thereof. In particular, it is favorable to use a resol-base alkylphenol/formaldehyde precondensate having two or more methylol groups in the molecule.

The vulcanizable rubbers constituting the compositions described in the items (i) and (iii) and the elastomer constituting the compositions described in the item (ii) are the same as those constituting the rubber member into which the fibrillated short fiber (A') is incorporated. Further, thermoplastic polyamides and urea resins are usable as the thermoplastic polymer having amido groups and constituting the compositions described in the item (i) and the thermoplastic polyamide constituting the compositions described in the item (ii). In particular, it is preferable to use one having a melting point of 135 to 350° C. Thermoplastic polyamides having melting points of 150 to 300° C. are particularly preferable.

Examples of the thermoplastic polyamide include nylon 6, nylon 66, nylon 6/nylon 66 copolymers, nylon 610, nylon 612, nylon 46, nylon 11, nylon 12, nylon MXD 6, xylylenediamine/adipic acid polycondensates, xylylenediamine/pimelic acid polycondensates, xylylenediamine/suberic acid polycondensates, xylylenediamine/azelaic acid polycondensates, xylylenediamine/sebacic acid polycondensates, tetramethylenediamine/terephthalic acid polycondensates, hexamethylenediamine/terephthalic acid polycondensates, octamethylenediamine/terephthalic acid polycondensates, trimethylhexamethylenediamine/terephthalic acid polycondensates, decamethylenediamine/terephthalic acid polycondensates, undecamethylenediamine/terephthalic acid polycondensates, dodecamethylenediamine/terephthalic acid polycondensates, tetramethylenediamine/isophthalic acid polycondensates, hexamethylenediamine/isophthalic acid polycondensates, octamethylenediamine/isophthalic acid polycondensates, trimethylhexamethylenediamine/isophthalic acid polycondensates, decamethylenediamine/ isophthalic acid polycondensates, undecamethylenediamine/isophthalic acid polycondensates, and dodecamethylenediamine/isophthalic acid polycondensates.

Among these thermoplastic polyamides, those having melting points of 160 to 265° C. are particularly preferable. Specific examples of such thermoplastic polyamides include nylon 6, nylon 66, nylon 6/nylon 66 copolymers, nylon 610, nylon 612, nylon 46, nylon 11 and nylon 12.

The polyolefin constituting the compositions described in the item (ii) is one having a melting point of 80 to 250° C. Alternatively, polyolefins having softening points of 50° C. or above, particularly 50 to 200° C. are also favorably usable. Preferable examples of such polyolefins include homo- and co-polymers of $C_2$–$C_8$ olefins, copolymers of $C_2$–$C_8$ olefins with aromatic vinyls such as styrene, chlorostyrene and a-methylstyrene, copolymers of $C_2$–$C_8$ olefin with vinyl acetate, copolymers of $C_2$–$C_8$ olefins with acrylic acid or esters thereof, copolymers of $C_2$–$C_8$ olefins with methacrylic acid or esters thereof, and copolymers of $C_2$–$C_8$ olefins with vinylsilanes.

Specific examples of the polyolefins include high-density polyethylene, low-density polyethylene, polypropylene, ethylene/propylene block copolymers, ethylene/propylene random copolymers, linear low-density polyethylene, poly-4-methylpentene-1, poly-butene-1, polyhexene-1, ethylene/vinyl acetate copolymers, ethylene/acrylic acid copolymers, ethylene/methyl acrylate copolymers, ethylene/ethyl acrylate copolymers, ethylene/propyl acrylate copolymers, ethylene/butyl acrylate copolymers, ethylene/2-ethylhexyl acrylate copolymers, ethylene/hydroxyethyl acrylate copolymers, ethylene/vinyltrimethoxysilane copolymers, ethylene/vinyltriethoxysilane copolymers, ethylene/vinylsilane copolymers, ethylene/styrene copolymers, and propylene/styrene copolymers. Further, halogenated polyolefins such as chlorinated, brominated or chlorosulfonated polyethylene are also favorably usable. These polyolefins may be used each alone or as a mixture of two or more of them.

Next, description will be made on the molding process for the rubber member according to the present invention. First, a predetermined amount of a short fiber (A) whose cross section takes a sea-island structure essentially composed of at least two polymers is added to a rubber composition containing carbon black, a vulcanizing agent, a vulcanization accelerator, a process oil and so on, followed by, if necessary, the addition of a predetermined amount of a composition comprising a short fiber (B) made of a thermoplastic polymer having amido groups in the main chain and the matrix wherein the fiber (B) is dispersed in the matrix and chemically bonded to the matrix. Then, the resulting mixture is masticated in a Banbury mixer to thereby disperse the short fibers (A) and (B) in the rubber uniformly.

The masticated composition is further kneaded between a pair of open rolls by applying mechanical shear force thereto to thereby fibrillate the short fiber (A) into the above short fiber (A') having an average diameter of 0.05 to 5.0 μm. The composition thus obtained is molded by the use of an extruder or the like into a sheet to thereby orientate the short fibers (A') and (B) in a predetermined direction.

EXAMPLE 1

Invention Tires 101 to 107 and Comparative Tires 101 and 102 each provided with compound sheets in both end portions of the belt layers respectively were produced, wherein the ratio of the tire circumferential modulus (b) of the compound sheets to the tire radial modulus (a) thereof (i.e., b/a ratio) was varied by incorporating a short fiber (A') formed by the fibrillation of a short fiber (A) whose cross section took a sea-island structure essentially composed of polyvinyl alcohol and cellulose acetate, and if necessary, a composition wherein a short fiber (B) made of nylon 6 having amido groups in the main chain was dispersed in a rubber matrix and chemically bonded to the matrix into the rubber constituting the compound sheets and orienting the fibrillated short fiber (A') and the short fiber (B) in a tire circumferential direction. Further, Conventional Tire 101 was also produced, which was provided with compound sheets not containing any short fiber. The sizes of these tires were 185/65R14 86H. In producing Invention Tires 101 to 107 and Comparative Tire 101 and 102, the short fibers (A) and (B) were used in various amounts per 100 parts by weight of the rubber. Further, these test tires were made different also in the ratio (%) of the width of the compound sheets to the maximum belt width and/or in the thickness (mm) of the compound sheets.

These test tires were evaluated for road noise and durability in high-speed running, and the results are given in Table 1.

Road Noise:

These test tires were put on wheels having rim sizes of 14×5·1/2JJ, and the air pressure was adjusted to 210 kPa. The resulting assemblies were mounted on an automobile having an engine displacement of 1800 cc. A microphone was set in the automobile on the window side of the driver's seat at the position corresponding to the ears of a driver, and the resulting automobile was made to travel on a rough road surface at a speed of 60 km/h to measure the interior noise. Thus, the sound pressure (dB) at 315 Hz was determined. The results are given in terms of differences from the value (reference) observed in the car mounted with Conventional Tire 101. A negative value means a road noise level smaller than the reference.

Durability in High-speed Running:

Each test tire was put on a wheel having rim sizes of 14×5·1/2, and the air pressure was adjusted to 210 kPa. The resulting assembly was mounted on a drum tester, and subjected to the test of durability in high-speed running according to JIS D4230 to measure the distance covered until the belt edge got out of order. The results are given in terms of indexes as calculated by taking the value of Conventional Tire 101 as 100. A larger index means more excellent durability in high-speed running.

EXAMPLE 2

Invention Tires 201 to 206 were produced, wherein the ratio of the tire circumferential modulus (b) of the tread to the tire radial modulus (a) thereof (i.e., b/a ratio) was varied by incorporating a short fiber (A') formed by the fibrillation of a short fiber (A) whose cross section took a sea-island structure essentially composed of polyvinyl alcohol and cellulose acetate, and if necessary, a composition wherein a short fiber (B) made of nylon 6 having amido groups in the main chain was dispersed in a rubber matrix and chemically bonded to the matrix into the rubber constituting the tread and orienting the fibrillated short fiber (A') and the short fiber (B) in a tire circumferential direction. Further, Conventional Tires 201 and 202 were also produced, the treads of which did not contain any short fiber. The sizes of these tires were 185/65R14 86H. In producing Invention Tires 201 to 206, the short fibers (A) and (B) were used in various amounts per 100 parts by weight of the rubber. Further, the treads of the tires had a block pattern and their groove area ratios were adjusted to 35%.

These test tires were evaluated for both braking performance on a dry road surface and that on a wet road surface by the following testing methods, and the results are given in Table 2. In Table 2, the JIS-A hardness values of the tread rubbers at 20° C. are also given in terms of indexes as calculated by taking the hardness of Conventional Tire 201 as 100. Further, the tanδ values of the tread rubbers of the test tires were adjusted to the same level.

Braking Performance on Dry Road Surface:

These test tires were put on wheels having rim sizes of 14×5·1/2, and the air pressure was adjusted to 210 kPa. The resulting assemblies were mounted on an automobile having an engine displacement of 1800 cc. The automobile was

TABLE 1

|  | Conventional Tire 101 | Comp. Tire 101 | Invention Tire 101 | Invention Tire 102 | Invention Tire 103 | Invention Tire 104 | Invention Tire 105 | Invention Tire 106 | Invention Tire 107 | Comp. Tire 102 |
|---|---|---|---|---|---|---|---|---|---|---|
| b/a | 1 | 1.1 | 1.3 | 1.3 | 1.3 | 4.8 | 1.3 | 1.3 | 3.1 | 9.2 |
| Short fiber (A) (pt. wt.) | 0 | 0.3 | 0.6 | 0.6 | 0.6 | 4 | 0.6 | 0.6 | 3 | 17 |
| Short fiber (B) (pt. wt.) | 0 | 0 | 0 | 0 | 0 | 0 | 0 | 0 | 1 | 0 |
| Width of compound sheet (%) | — (no sheet used) | 20 | 20 | 20 | 20 | 20 | 7 | 20 | 20 | 20 |
| Thickness of compound sheet (mm) | — (no sheet used) | 0.6 | 0.6 | 0.6 | 0.6 | 0.6 | 0.6 | 0.3 | 0.6 | 0.6 |
| Road noise (dB) | ref. | −0.1 | −0.5 | −0.8 | −0.3 | −1.0 | −0.3 | −0.3 | −1.0 | −1.0 |
| Durability in high-speed running | 100 | 100 | 100 | 100 | 100 | 100 | 100 | 100 | 102 | 100 |
| Processability | ○ | ○ | ○ | ○ | ○ | ○ | ○ | ○ | ○ | x |
| Arrangement of compound sheets | — | FIG. 2 | FIG. 1 | FIG. 2 | FIG. 3 | FIG. 2 | FIG. 2 | FIG. 2 | FIG. 2 | FIG. 2 |

As apparent from the results given in Table 1, Invention Tires 101 to 107 were reduced in road noise with their durability in high-speed running which is one of the basic tire performance parameters being kept at high levels. Comparative Tire 101 was unsatisfactory reduced in road noise owing to poor anisotropy of the compound sheets. Further, Comparative Tire 102 was reduced in road noise, but was disadvantageous in that the compound sheets were very poor in processability because of the presence of the short fiber in an excess.

made to travel on a dry road surface at a speed of 80 km/h, and then braked to a halt to measure the braking distance. The results are given in terms of indexes as calculated by taking the inverse number of the measured value of Conventional Tire 201 as 100. A larger index means more excellent braking performance on a dry road surface.

Braking Performance on a Wet Road Surface:

Test tires were put on wheels having rim sizes of 14×5·1/2, and the air pressure was adjusted to 210 kPa. The resulting assemblies were mounted on an automobile having an engine displacement of 1800 cc. The automobile was made to travel on a wet road surface at a speed of 80 km/h, and then braked to a halt to measure the braking distance. The results are given in terms of indexes as calculated by taking the inverse number of the measured value of Conventional Tire 21 as 100. A larger index means more excellent braking performance on a wet road surface.

TABLE 2

|  | Hardness of tread rubber | b/a | Short fiber A | Short fiber B | Braking performance (dry) | Braking performance (wet) |
|---|---|---|---|---|---|---|
| Conventional Tire 201 | 100 | 1 | — | — | 100 | 100 |
| Conventional Tire 202 | 90 | 1 | — | — | 97 | 102 |
| Invention Tire 201 | 90 | 1.2 | 0.5 | — | 108 | 112 |
| Invention Tire 202 | 90 | 9.7 | 15 | — | 112 | 113 |
| Invention Tire 203 | 90 | 1.2 | 0.5 | 1 | 110 | 113 |
| Invention Tire 204 | 90 | 3.0 | 0.5 | 15 | 114 | 115 |
| Invention Tire 205 | 90 | 8.4 | 10 | 1 | 117 | 119 |
| Invention Tire 206 | 90 | 9.2 | 10 | 15 | 118 | 120 |

As apparent from the results given in Table 2, Invention Tires 201 to 206 were able to be improved in both braking performance on a dry road surface and that on a wet road surface, as compared with Conventional Tires 201 and 202.

Table 3 shows results as observed with respect to tires which had the same tire sizes as described above and whose treads had a ratio of tire circumferential modulus (b) to tire radial modulus (a) (i.e., b/a ratio of 1.2 and various groove area ratios.

TABLE 3

|  | b/a | Groove area ratio | Braking performance (dry) | Braking performance (wet) |
|---|---|---|---|---|
| Comp. Tire 201 | 1.2 | 25 | 99 | 101 |
| Invention Tire 207 | 1.2 | 30 | 105 | 106 |
| Invention Tire 208 | 1.2 | 35 | 104 | 108 |
| Invention Tire 209 | 1.2 | 40 | 103 | 105 |
| Comp. Tire 202 | 1.2 | 45 | 97 | 100 |

As apparent from the results given in Table 3, Invention Tires 207 to 209 were improved in both braking performance on a dry road surface and that on a wet road surface, which supports the necessity of limiting the groove area ratio of the tread to 30 to 40%.

EXAMPLE 3

Invention Tires 301 to 305 each provided with a two-layer tread constituted of a cap tread and an under tread were produced, wherein the ratio of the tire circumferential modulus (b) of the under tread to the tire widthwise modulus (a) thereof (i.e., b/a ratio) was varied by incorporating a short fiber (A') formed by the fibrillation of a short fiber (A) whose cross section took a sea-island structure essentially composed of polyvinyl alcohol and cellulose acetate, and if necessary, a composition wherein a short fiber (B) made of nylon 6 having amido groups in the main chain was dispersed in a rubber matrix and chemically bonded to the matrix into the rubber constituting the under tread and orienting the fibrillated short fiber (A') and the short fiber (B) in a tire circumferential direction. Further, Conventional Tire 301 and Comparative Tires 301 to 303 whose under treads did not contain any short fiber and Comparative Tires 304 to 306 whose under treads contained the short fiber(s) were also produced. The sizes of these tires were 185/65R14 86H. In producing Invention Tires 301 to 305 and Comparative Tires 304 to 306, the short fibers (A) and (B) were used in various amounts per 100 parts by weight of the rubber.

These test tires were evaluated for rolling resistance, stability in steering and durability in high-speed running by the following testing methods, and the results are given in Table 4. The formulations of the under treads are given more specifically in Table 5. In Table 4, each figure in parentheses in the row of "short fiber (B)" refers to the amount of nylon.

Rolling Resistance:

Each test tire was put on a wheel having rim sizes of 14×5·1/2JJ, and the air pressure was adjusted to 210 kPa. The resulting assembly was mounted on a drum tester and examined for rolling resistance by the use of a load cell. The results are given in terms of indexes as calculated by taking the rolling resistance of Conventional Tire 301 as 100. A smaller index value means lower rolling resistance.

Stability in Steering:

Test tires were put on wheels having rim sizes of 14×5·1/2JJ, and the air pressure was adjusted to 210 kPa. The resulting assemblies were mounted on an automobile having an engine displacement of 1800 cc, and the resulting automobile was evaluated for stability in steering by five test drivers according to a feeling test. The results are given in five ranks. A higher value means more excellent stability in steering.

Durability in High-speed Running:

Each test tire was put on a wheel having rim sizes of 14×5·1/2JJ, and the air pressure was adjusted to 210 kPa. The resulting assembly was mounted on a drum tester and subjected to the test of durability in high-speed running according to JIS D4230. In Table 4, "⊚" refers to excellent, "○" good, "Δ" fair, and "X" bad.

TABLE 4

| Formulation of rubber | Conventional Tire 301 | Comp. Tire 301 | Comp. Tire 302 | Comp. Tire 303 | Invention Tire 301 | Invention Tire 302 | Comp. Tire 304 | Comp. Tire 305 | Invention Tire 303 | Invention Tire 304 | Invention Tire 305 | Comp. Tire 306 |
|---|---|---|---|---|---|---|---|---|---|---|---|---|
| NR phr | 70 | 70 | 60 | 60 | 60 | 60 | 60 | 60 | 60 | 60 | 60 | 60 |
| SBR phr | 30 | 30 |  |  |  |  |  |  |  |  |  |  |
| BR phr |  |  | 40 | 40 | 40 | 40 | 40 | 40 | 40 | 40 | 40 | 40 |
| Carbon phr | 50 | 40 | 50 | 65 | 50 | 50 | 50 | 50 | 50 | 50 | 50 | 50 |
| Short fiber(A) phr |  |  |  |  | 1 | 5 |  |  | 15 | 3 | 12 | 17 |
| Short fiber(B) phr(Ny) |  |  |  |  |  |  | 15(5) | 45(15) |  | 3(1) | 30(10) |  |
| Physical properties |  |  |  |  |  |  |  |  |  |  |  |  |

TABLE 4-continued

| Formulation of rubber | Conventional Tire 301 | Comp. Tire 301 | Comp. Tire 302 | Comp. Tire 303 | Invention Tire 301 | Invention Tire 302 | Comp. Tire 304 | Comp. Tire 305 | Invention Tire 303 | Invention Tire 304 | Invention Tire 305 | Comp. Tire 306 |
|---|---|---|---|---|---|---|---|---|---|---|---|---|
| JIS hardness | 58 | 53 | 54 | 61 | 61 | 67 | 62 | 76 | 81 | 66 | 85 | 82 |
| Mooney viscosity | 70 | 60 | 65 | 85 | 65 | 61 | 69 | 87 | 42 | 63 | 78 | 41 |
| Processability in extrusion | ○ | ○ | ⊚ | ⊚ | ⊚ | ○ | ○ | x | △ | ○ | △ | x |
| Rubber flow | △ | x | x | △ | ○ | ⊚ | ○ | ○ | ⊚ | ○ | ⊚ | ⊚ |
| b/a (mm) | 1 | 1 | 1 | 1 | 1.5 | 3.8 | 2 | 3.2 | 7.1 | 2.5 | 5.6 | 7.3 |
| thickness of under tread | 1.2 | 1.2 | 1.2 | 1.2 | 1.2 | 1.2 | 1.2 | 1.2 | 1.2 | 1.2 | 1.2 | 1.2 |
| Test results | | | | | | | | | | | | |
| Rolling resistance | 100 | 99 | 98 | 101 | 98 | 98 | 99 | 99 | 98 | 98 | 98 | 98 |
| Stability in steering | 3 | 2 | 2.5 | 3.5 | 3 | 3.5 | 2.5 | 3 | 4 | 3 | 4 | 4 |
| Durability in high-speed running | ○ | ○ | ○ | x | ○ | ○ | ○ | ○ | ○ | ⊚ | ⊚ | ○ |

TABLE 5

| Formulation of rubber | Trade name | Maker | Amt. (Phr) |
|---|---|---|---|
| NR | RSS #3 | | variable |
| SBR | Nipol 1502 | Nippon Zeon Co., Ltd. | variable |
| BR | Nipol BR1220 | Nippon Zeon Co., Ltd. | variable |
| short fiber (A) | K-II SA | Kuraray Co., Ltd. | variable |
| short fiber (B) | UBE HA1060 | Ube Industries, Ltd. | variable |
| carbon (FEF) | HTC-100 | Chubu Carbon | 50 |
| aromatic oil | Komorex 300 | Nippon Oil Co., Ltd. | 5 |
| zinc oxide | zinc white #3 | Shodo Kayaku | 5 |
| stearic acid | Bee's stearic acid | | 1 |
| age resister | Nocrac 224 | Ohuchi Shinko Kagaku | 1 |
| sulfur | | Sanshin Chemical Industry | 3 |
| vulcanization accelerator | Nocceler NS-F | Ohuchi Shinko Kagaku | 1 | short fiber (A): PVA/polyacrylonitrile (PAN) (60/40)
short fiber (B): NR/HDPE/Nylon (38/29/33)

As apparent from the results given in Table 4, the amount of carbon used for Comparative Tire 301 was smaller than that used for Conventional Tire 301, so that Comparative Tire 301 was poorer in stability in steering than Conventional Tire 301 and exhibited a large scattering in the gauge owing to significant rubber flow. Comparative Tire 302 produced by using a butadiene rubber having high impact resilience underwent unfavorable rubber flow and exhibited poor stability in steering, even though it was lowered in rolling resistance. Comparative Tire 303 produced by using an increased amount of carbon fiber exhibited high rolling resistance and poor durability in high-speed running, even though improved in stability in steering.

Invention Tire 301 was improved in the prevention of rubber flow by virtue of the addition of the short fiber (A), and was therefore able to be lowered in rolling resistance with the stability in steering being kept at a high level. Invention Tires 302 and 303 were further improved in the prevention of rubber flow by virtue of the addition of an increased amount of the short fiber (A), and were therefore able to exhibit further improved stability in steering. Comparative Tire 304 was poor in stability in steering, because only the nylon short fiber (B) was added to the under tread. With respect to Comparative Tire 305, the rubber composition exhibited too high a Mooney viscosity to attain good processability in extrusion as a result of the existence of too large an amount of the nylon fiber (B).

With respect to Invention Tires 304 and 305, the hybridzation of the short fiber (A) with the nylon short fiber (B) became possible, because the addition of the short fiber (A) gave a rubber composition having a low Mooney viscosity. Thus, Invention Tires 304 and 305 were able to be improved in durability in high-speed running. With respect to Comparative Tire 306, the rubber composition was poor in processability in extrusion because of the existence of too large an amount of the short fiber (A).

EXAMPLE 4

Invention Tires 401 to 412 and Comparative tires 401 and 402 were produced, wherein at least a part of the sidewall was made of a rubber composition containing a short fiber (A') formed by the fibrillation of a short fiber (A) whose cross section took a sea-island structure essentially composed of polyvinyl alcohol and cellulose acetate (at a ratio of 60:40), and if necessary, a composition wherein a short fiber (B) made of nylon 6 having amido groups in the main chain was dispersed in a rubber matrix and chemically bonded to the matrix. Further, Conventional Tires 401 and 402 were also produced, which did not contain any short fiber in the sidewall. The sizes of these tires were 185/65R14. In producing these test tires, the short fibers (A) and (B) were used in various amounts per 100 parts by weight of the rubber. The formulation of the rubber composition constituting the sidewalls of the tires is given in Table 6.

TABLE 6

| | | Amt. (pt. wt.) |
|---|---|---|
| NR | 1) | 50 |
| BR | 2) | 50 |
| carbon black (FEF class) | 3) | 50 |
| stearic acid | 4) | 2 |
| zinc oxide | 5) | 3 |
| sulfur | 6) | 2 |
| vulcanization accelerator (NS) | 7) | 1 |
| age resister (RD) | 8) | 2 |
| age resister (6C) | 9) | 3 |
| aromatic oil | 10) | 5 |

1) RSS #1
2) a product of Nippon Zeon Co., Ltd., Nipol 1220
3) a product of Chubu Carbon, HTC100
4) a product of Kao Corporation, Lunac YA
5) a product of Toho Zinc Co., Ltd., Ginrei zinc flower
6) a product of karuizawa Seiren-sho, powdered sulfur
7) a product of Ohuchi Shinko Kagaku, Nocceler NS-F
8) a product of Ohuchi Shinko Kagaku, Nocrac 224
9) a product of Ohuchi Shinko Kagaku, Nocrac 6C
10) a product of Nippon Oil Co., Ltd., Komorex 300

These test tires were evaluated for resistances to external damage and crack growth, and the results are given in Tables 7 and 8. The average lengths of the short fiber (A), the average diameters of the short fiber (A) after fibrillation and the specific constitutions of the tires are also given in Tables 7 and 8. The positions of upper and lower ends of the short fiber reinforced rubbers are given in terms of ratios of the heights of the upper and lower ends from the bead heel to the tire sectional height SH.

Resistance to External Damage:

Test tires were put on wheels having rim sizes of 14×5·1/2JJ, and the air pressure was adjusted to 200 kPa. The resulting assemblies were mounted on an automobile having an engine displacement of 1600 cc. This automobile was made to climb over a 100-mm high block made of steel at an approach angle of 30° with the speed being gradually enhanced from 10 km/h in steps of 1.0 km/h. The critical speed up to which the tire did not burst was measured three times and the average of the three values was calculated. The results are shown by "X" referring to the case wherein the average critical speed is lower than that of Conventional Tire 401, "○" referring to the case wherein the average critical speed is higher than that of Conventional Tire 401 and "⊙" referring to the case wherein it is higher than that of Conventional Tire 401 by 2 km/h or above.

Resistance to Crack Growth:

A cut having a length of 5 mm and a depth of 1.5 mm was made with a knife on the sidewall face of each test tire at an angle of 45° to the radial direction. The resulting tire was put on a wheel having rim sizes of 14×5·1/2. The resulting assembly was mounted on a steel drum tester having a diameter of 1707 mm and a smooth surface. After 5000-km traveling under the conditions of air pressure of 180 kPa, load of 3.74 kN and speed of 81 km/h, the length of the resulting cut was measured. The results are given by "X" referring to the case wherein the length of the cut exceeds 10 mm, "○" referring to the case wherein the length is 10 mm or below, and "⊙" referring to the case wherein the length is 8 mm or below.

TABLE 7

|  | Conventional Tire 401 | Conventional Tire 402 | Comp. Tire 401 | Invention Tire 401 | Invention Tire 402 | Invention Tire 403 | Invention Tire 404 | Invention Tire 405 |
|---|---|---|---|---|---|---|---|---|
| Formulation of sidewall rubber |  |  |  |  |  |  |  |  |
| NR (pt. wt.) | 50 | 50 | 50 | 50 | 50 | 50 | 50 | 50 |
| BR (pt. wt.) | 50 | 50 | 50 | 50 | 50 | 50 | 50 | 50 |
| short fiber (A) (pt. wt.) | — | — | 0.3 | 0.5 | 15 | 5 | 5 | 5 |
| short fiber (B) (pt. wt.) | — | — | — | — | — | — | — | — |
| Short fiber (A) |  |  |  |  |  |  |  |  |
| av. length (μm) | — | — | 2000 | 2000 | 2000 | 1 | 5000 | 2000 |
| av. diam. after fibrillation (μm) | — | — | 1 | 1 | 1 | 1 | 1 | 0.05 |
| Tire constitution (sidewall) |  |  |  |  |  |  |  |  |
| arrangement of short fiber reinforced rubber | — | — | FIG. 6 | FIG. 6 | FIG. 6 | FIG. 6 | FIG. 6 | FIG. 6 |
| thickness of rubber (not containing short fiber) (mm) | 3 | 2.5 | 0 | 0 | 0 | 0 | 0 | 0 |
| thickness of fiber-reinforced rubber (mm) | 0 | 0 | 2.5 | 2.5 | 2.5 | 2.5 | 2.5 | 2.5 |
| total thickness of sidewall (mm) | 3 | 2.5 | 2.5 | 2.5 | 2.5 | 2.5 | 2.5 | 2.5 |
| percentage of thickness of fiber-reinforced rubber (%) | 0 | 0 | 100 | 100 | 100 | 100 | 100 | 100 |
| position of upper end of short fiber reinforced rubber (%) | — | — | 80 | 80 | 80 | 80 | 80 | 80 |
| position of lower end of short fiber reinforced rubber (%) | — | — | 20 | 20 | 20 | 20 | 20 | 20 |
| tire mass (g) | 7300 | 7150 | 7150 | 7150 | 7150 | 7150 | 7150 | 7150 |
| Test results |  |  |  |  |  |  |  |  |
| resistance to external damage (acceptable or not) | ○ | x | x | ○ | ○ | ○ | ○ | ○ |
| resistance to crack growth (acceptable or not) | ⊙ | ⊙ | ○ | ○ | ○ | ○ | ○ | ○ |

TABLE 8

|  | Invention Tire 406 | Comp. Tire 402 | Invention Tire 407 | Invention Tire 408 | Invention Tire 409 | Invention Tire 410 | Invention Tire 411 | Invention Tire 412 |
|---|---|---|---|---|---|---|---|---|
| Formulation of sidewall rubber |  |  |  |  |  |  |  |  |
| NR (pt. wt.) | 50 | 50 | 50 | 50 | 50 | 50 | 50 | 50 |
| BR (pt. wt.) | 50 | 50 | 50 | 50 | 50 | 50 | 50 | 50 |
| short fiber (A) (pt. wt.) | 5 | — | 0.5 | 0.5 | 10 | 10 | 5 | 5 |
| short fiber (B) (pt. wt.) | — | 15 | 1 | 15 | 1 | 15 | — | — |
| Short fiber (A) |  |  |  |  |  |  |  |  |
| av. length (μm) | 2000 | — | 2000 | 2000 | 2000 | 2000 | 2000 | 2000 |
| av. diam. after fibrillation (μm) | 5 | — | 1 | 1 | 1 | 1 | 1 | 1 |
| Tire constitution (sidewall) |  |  |  |  |  |  |  |  |
| arrangement of short fiber reinforced rubber | FIG. 6 | FIG. 6 | FIG. 6 | FIG. 6 | FIG. 6 | FIG. 6 | FIG. 7 | FIG. 8 |
| thickness of rubber (not containing short fiber) (mm) | 0 | 0 | 0 | 0 | 0 | 0 | 1.5 | 1.5 |
| thickness of fiber-reinforced rubber (mm) | 2.5 | 2.5 | 2.5 | 2.5 | 2.5 | 2.5 | 1 | 1 |

TABLE 8-continued

|  | Invention Tire 406 | Comp. Tire 402 | Invention Tire 407 | Invention Tire 408 | Invention Tire 409 | Invention Tire 410 | Invention Tire 411 | Invention Tire 412 |
|---|---|---|---|---|---|---|---|---|
| total thickness of sidewall (mm) | 2.5 | 2.5 | 2.5 | 2.5 | 2.5 | 2.5 | 2.5 | 2.5 |
| percentage of thickness of fiber-reinforced rubber (%) | 100 | 100 | 100 | 100 | 100 | 100 | 40 | 40 |
| position of upper end of short fiber reinforced rubber (%) | 80 | 80 | 80 | 80 | 80 | 80 | 80 | 80 |
| position of lower end of short fiber reinforced rubber (%) | 20 | 20 | 20 | 20 | 20 | 20 | 20 | 20 |
| tire mass (g) | 7150 | 7150 | 7150 | 7150 | 7150 | 7150 | 7150 | 7150 |
| Test results |  |  |  |  |  |  |  |  |
| resistance to external damage (acceptable or not) | ○ | x | ○ | ○ | ○ | ○ | ○ | ○ |
| resistance to crack growth (acceptable or not) | ○ | ○ | ⊚ | ⊚ | ⊚ | ⊚ | ○ | ○ |

As apparent from the results given in Tables 7 and 8, Invention Tires 401 to 410 had a sidewall thickness smaller than that of Comparative Tire 401. That is, they were able to be reduced in tire weight without any adverse effect on the resistance to external damage. In particular, Invention Tires 407 to 410 were able to be improved in not only resistance to external damage but also resistance to crack growth by virtue of the hybridization between the short fibers (A) and (B). Invention Tire 411 is one wherein the outer portion of the sidewall is made of a rubber composition reinforced with the short fiber and the inner portion thereof is made of a rubber composition not containing the short fiber, while Invention Tire 412 is one wherein the inner portion of the side wall is made of a rubber composition reinforced with the short fiber and the outer portion thereof is made of a rubber composition not containing the short fiber. Both of the tires could be reduced in tire weight without any adverse effect-on the resistance to external damage.

On the other hand, Conventional Tire 402 exhibited poor resistance to external damage, because it is one having the same constitution as that of Conventional Tire 401 except that the sidewall thickness is reduced. Comparative Tire 401 was unsatisfactory in the reinforcement of the sidewall and exhibited poor resistance to external damage as a result of the addition of too small an amount of the short fiber (A). Comparative Tire 402 contained in the side wall the short fiber (B) not together with the short fiber (A) but alone, so that the sidewall was unsatisfactorily reinforced and exhibited poor resistance to external damage.

EXAMPLE 5

Invention Tires 501 to 507 were produced, which were heavy-duty pneumatic radial tires each comprising a carcass layer containing a plurality of carcass cords in a state arranged in the tire radial direction and bridging a pair of, i.e., lefthand and righthand bead portions with the tire widthwise end portions of the carcass layer wound up around the bead cores respectively from the tire inner side to the tire outer side, and short fiber reinforced layers lying at least in the wound-up end portions of the carcass layer. Further, Conventional Tire 501 was also produced, which was a pneumatic radial tire as described above wherein the short fiber reinforced layers were replaced by rubber reinforcement layers. The tire sizes of these tires were 11R22.5 14PR.

In producing Invention Tires 501 to 507, the ratio of the tire circumferential modulus (b) of the short fiber reinforced layers to the tire radial modulus (b) thereof (i.e., b/a ratio) was varied by incorporating a short fiber (A') formed by the fibrillation of a short fiber (A) whose cross section took a sea-island structure essentially composed of polyvinyl alcohol and cellulose acetate, and, if necessary a composition wherein a short fiber (B) made of nylon 6 having amido groups in the main chain was dispersed in a rubber matrix and chemically bonded to the matrix into the rubber constituting the short fiber reinforced layers and orienting the fibrillated short fiber (A') and the short fiber (B) in a tire circumferential direction. Further, in producing Invention Tires 501 to 507, the short fibers (A) and (B) were used in various amounts per 100 parts by weight of the rubber.

These test tires were evaluated for durability in high-speed running by the following testing method, and the results are given in Table 9.

Durability in High-speed Running:

Each test tire was mounted on a drum tester with the air pressure adjusted to 700 kPa and subjected to the test of durability in high-speed running according to JIS D4230 to measure the distance covered until the bead portion got out of order. The results are given in terms of indexes as calculated by taking the distance of Conventional Tire 501 as 100. A larger index means more excellent durability in high-speed running.

TABLE 9

|  | Conventional Tire 501 | Invention Tire 501 | Invention Tire 502 | Invention Tire 503 | Invention Tire 504 | Invention Tire 505 | Invention Tire 506 | Invention Tire 507 |
|---|---|---|---|---|---|---|---|---|
| Edge cover for carcass layer (see FIG. 9) |  |  |  |  |  |  |  |  |
| b/a | 1.0 | 1.2 | 1.2 | 1.2 | 1.3 | 1.3 | 1.3 | 6.5 |
| short fiber (A) (pt. wt.) | — | 0.5 | 0.5 | 0.5 | 0.5 | 0.5 | 0.5 | 10.0 |
| short fiber (B) (pt. wt.) | — | — | — | — | 1.0 | 1.0 | 1.0 | 15.0 |

TABLE 9-continued

|  | Conventional Tire 501 | Invention Tire 501 | Invention Tire 502 | Invention Tire 503 | Invention Tire 504 | Invention Tire 505 | Invention Tire 506 | Invention Tire 507 |
|---|---|---|---|---|---|---|---|---|
| Edge cover for steel cord reinforced layer (see FIG. 9) | | | | | | | | |
| b/a | 1.0 | 1.0 | 1.2 | 1.2 | 1.0 | 1.3 | 1.3 | 6.5 |
| short fiber (A) (pt. wt.) | — | — | 0.5 | 0.5 | — | 0.5 | 0.5 | 10.0 |
| short fiber (B) (pt. wt.) | — | — | — | — | — | 1.0 | 1.0 | 15.0 |
| Reinforcement for bead portion (see FIG. 11) | | | | | | | | |
| b/a | 1.0 | 1.0 | 1.0 | 1.2 | 1.0 | 1.0 | 1.3 | 6.5 |
| short fiber (A) (pt. wt.) | — | — | — | 0.5 | — | — | 0.5 | 10.0 |
| short fiber (B) (pt. wt.) | — | — | — | — | — | — | 1.0 | 15.0 |
| Durability in high-speed running | 100 | 107.4 | 110.2 | 134.5 | 112.7 | 115.3 | 146.3 | 147.5 |

As apparent from the results given in Table 9, Invention Tires 501 to 507 were able to be remarkably improved in durability in high-speed running as compared with Conventional Tire 501, even though the rubber volumes of bead portions of Invention Tires 501 to 507 were equivalent to that of Conventional Tire 501. In particular, Invention Tires 504 to 507 whose short fiber reinforced layers were prepared by the hybridization between the short fibers (A) and (B) were remarkably improved in the durability.

EXAMPLE 6

Invention Tires 601 to 618 and Comparative Tires 601 to 609 were produced, which were each provided with bead fillers on the outer peripheral sides of the bead cores. In this production, the bead fillers were made by incorporating a short fiber (A') formed by the fibrillation of a short fiber (A) whose cross section took a sea-island structure essentially composed of polyvinyl alcohol and cellulose acetate and, if necessary, a composition wherein a short fiber (B) made of nylon 6 having amido groups in the main chain was dispersed in a rubber matrix and chemically bonded to the matrix into the rubber constituting the bead fillers and orienting the short fibers (A') and (B) in a tire circumferential direction, by which the ratio of the storage modulus (b) of the bead fillers in the direction of orientation of the short fiber to the tire radical modulus (a) thereof (i.e., b/a ratio) was varied. Further, Conventional Tire 601 was also produced, which was provided with bead fillers not containing any short fiber but containing steel reinforcements lying in the neighborhood thereof. The sizes of these tires were 185/60R14 91H.

In producing Invention Tires 601 to 618 and Comparative Tires 601 to 609, the short fibers (A) and (B) were used in various amounts per 100 parts by weight of the rubber. Further, in producing these tires, the short fibers in the bead fillers were oriented in a tire circumferential diresction (FIG. 13), in a tire axial direction (FIG. 14) or in a combination of both (FIG. 15).

These test tires were evaluated for comfortableness in riding, stability in steering and a light weight by the following testing methods, and the results are given in Tables 10 to 12.

Comfortableness in Riding:

Test tires were put on wheels having rim sizes of 14×5·1/2JJ, and the air pressure was adjusted to 200 kPa. The resulting assemblies were mounted on an automobile having an engine displacement of 1800 cc, and the automobile was evaluated for comfortableness in riding by five test drivers according to a feeling test. The results are given in terms of indexes as calculated by taking the comfortableness of Conventional Tire 601 as 100. A higher value means more excellent comfortableness in riding.

Stability in Steering:

Test tires were put on wheels having rim sizes of 14×5·1/2JJ, and the air pressure was adjusted to 200 kPa. The resulting assemblies were mounted on an automobile having an engine displacement of 1800 cc, and the automobile was evaluated for stability in steering by five test drivers according to a feeling test. The results are given in terms of indexes as calculated by taking the stability in steering of Conventional Tire 601 as 100. A higher value means more excellent stability in steering.

Lightweightness:

The weights of the test tires were measured, and the results are given in terms of indexes as calculated by taking the inversed number of the measured weight of Conventional Tire 601 as 100. A larger index means a lighter tire.

TABLE 10

|  | Conventional Tire 601 | Comp. Tire 601 | Comp. Tire 602 | Comp. Tire 603 | Invention Tire 601 | Invention Tire 602 | Invention Tire 603 | Invention Tire 604 | Invention Tire 605 | Invention Tire 606 |
|---|---|---|---|---|---|---|---|---|---|---|
| b/a | (1.0) | 3 | 3 | 3 | 5 | 5 | 5 | 10 | 10 | 10 |
| short fiber (A) (pt. wt.) | — | 2 | 2 | 2 | 4 | 4 | 4 | 15 | 15 | 15 |
| short fiber (B) (pt. wt.) | — | — | — | — | — | — | — | — | — | — |
| direction of orientation of short fiber | not used | axial | circumferential | axial and circumferential | axial | circumferential | axial and circumferential | axial | circumferential | axial and circumferential |
| steel reinforcement | used | not used | not used | not used | not used | not used | not used | not used | not used | not used |
| comfortableness in riding | 100 | 105 | 105 | 105 | 105 | 105 | 105 | 105 | 105 | 105 |
| stability in steering | 100 | 96 | 96 | 97 | 101 | 101 | 102 | 106 | 106 | 107 |
| lightweightness | 100 | 110 | 110 | 110 | 110 | 110 | 110 | 110 | 110 | 110 |

TABLE 11

|  | Comp. Tire 604 | Comp. Tire 605 | Comp. Tire 606 | Invention Tire 607 | Invention Tire 608 | Invention Tire 609 | Invention Tire 610 | Invention Tire 611 | Invention Tire 612 |
|---|---|---|---|---|---|---|---|---|---|
| b/a | 3 | 3 | 3 | 5 | 5 | 5 | 10 | 10 | 10 |
| short fiber (A) (pt. wt.) | 2 | 2 | 2 | 3 | 3 | 3 | 10 | 10 | 10 |
| short fiber (B) (pt. wt.) | 1 | 1 | 1 | 1 | 1 | 1 | 15 | 15 | 15 |
| direction of orientation of short fiber | axial | circum-ferential | axial and circum-ferential | axial | circum-ferential | axial and circum-ferential | axial | circum-ferential | axial and circum-ferential |
| steel reinforcement | not used | not used | not used | not used | not used | not used | not used | not used | not used |
| comfortableness in riding | 105 | 105 | 105 | 105 | 105 | 105 | 105 | 105 | 105 |
| stability in steering | 95 | 95 | 96 | 100 | 100 | 101 | 105 | 105 | 106 |
| lightweightness | 110 | 110 | 110 | 110 | 110 | 110 | 110 | 110 | 110 |

TABLE 12

|  | Comp. Tire 607 | Comp. Tire 608 | Comp. Tire 609 | Invention Tire 613 | Invention Tire 614 | Invention Tire 615 | Invention Tire 616 | Invention Tire 617 | Invention Tire 618 |
|---|---|---|---|---|---|---|---|---|---|
| b/a | 2 | 2 | 2 | 6 | 6 | 6 | 5 | 5 | 5 |
| short fiber (A) (pt. wt.) | — | — | — | 5 | 5 | 5 | 3 | 3 | 3 |
| short fiber (B) (pt. wt.) | 5 | 5 | 5 | 3 | 3 | 3 | 10 | 10 | 10 |
| direction of orientation of short fiber | axial | circum-ferential | axial and circum-ferential | axial | circum-ferential | axial and circum-ferential | axial | circum-ferential | axial and circum-ferential |
| steel reinforcement | not used | not used | not used | not used | not used | not used | not used | not used | not used |
| comfortableness in riding | 105 | 105 | 105 | 105 | 105 | 105 | 105 | 105 | 105 |
| stability in steering | 98 | 98 | 99 | 102 | 102 | 103 | 107 | 107 | 108 |
| lightweightness | 110 | 110 | 110 | 110 | 110 | 110 | 110 | 110 | 110 |

As apparent from the results given in Tables 10 to 12, Invention Tires 601 to 618 were able to be improved in comfortableness in riding and reduced in weight as compared with Conventional Tire 601 provided with steel reinforcements, with their stability in steering being kept at levels equivalent or superior to that of Conventional Tire 601. On the other hand, Comparative Tires 601 to 609 were unsatisfactory in stability in steering owing to poor anisotropy of the bead fillers.

What is claimed is:

1. A pneumatic tire comprising a tread containing a short fiber A' formed by the fibrillation of a short fiber A whose cross section takes a sea-island structure essentially composed of at least two polymers, wherein the ratio b/a of the tire circumferential modulus b of the tread to the tire radial modulus a thereof is adjusted to 1.2 or above by incorporating said short fiber A' formed by the fibrillation of the above short fiber A into the tread rubber in a proportion of 0.5 to 15 parts by weight per 100 parts by weight of the rubber and orientating the short fiber A' in a tire circumferential direction, and the groove area ratio of the tread is adjusted to 30 to 40%.

2. A pneumatic tire according to claim 1, wherein the fibrillated short fiber A' has an average diameter of 0.05 to 5.0 μm.

* * * * *